(12) United States Patent
Kerschbaum et al.

(10) Patent No.: US 7,860,245 B2
(45) Date of Patent: Dec. 28, 2010

(54) METHODS AND SYSTEMS FOR MULTI-PARTY SORTING OF PRIVATE VALUES

(75) Inventors: Florian Kerschbaum, Karlsruhe (DE); Orestis Terzidis, Schwetzinen (DE)

(73) Assignee: SAP AG, Walldorf (DE)

( * ) Notice: Subject to any disclaimer, the term of this patent is extended or adjusted under 35 U.S.C. 154(b) by 963 days.

(21) Appl. No.: 11/716,507

(22) Filed: Mar. 9, 2007

(65) Prior Publication Data

US 2007/0220094 A1    Sep. 20, 2007

(30) Foreign Application Priority Data

Mar. 15, 2006    (EP) .................... 06005285

(51) Int. Cl.
*H04K 1/10*    (2006.01)
*H04L 9/00*    (2006.01)
*H04L 29/06*   (2006.01)
*H04N 3/38*    (2006.01)
*G06F 15/16*   (2006.01)
*G06F 7/04*    (2006.01)

(52) U.S. Cl. ............... 380/33; 380/47; 380/207; 380/250; 713/150; 726/27; 709/205

(58) Field of Classification Search .............. 380/33, 380/47, 207, 250; 713/150; 726/27; 709/205
See application file for complete search history.

(56) References Cited

U.S. PATENT DOCUMENTS

| 6,490,680 B1 | 12/2002 | Scheidt et al. |
| 2007/0156586 A1 | 7/2007 | Kerschbaum |

OTHER PUBLICATIONS

"European Search Report for Application No. 06005285.9-2415", (Sep. 6, 2006).
Yao, A C., "Protocols for secure computations", (1982),160-164.

*Primary Examiner*—Nasser Moazzami
*Assistant Examiner*—Mohammad W Reza
(74) *Attorney, Agent, or Firm*—Schwegman, Lundberg & Woessner, P.A.

(57) ABSTRACT

Disclosed embodiments include a computer-implemented first method for providing the blinded result of a subtraction of a first split value of a first system from a second split value of the first system for a comparison. Furthermore, a computer-implemented second method is disclosed for computing a comparison of the blinded result of the subtraction provided by the first system with a result of a subtraction of a blinded first split value of a second system from a blinded second split value of the second system. Computer-implemented further methods for providing a contribution to the comparison of the split values are disclosed. The further methods involve a third system and a fourth system.

25 Claims, 9 Drawing Sheets

| Value | Purpose | Known to |
|---|---|---|
| r_[AB] | Hides the difference (a − b) by multiplication | A, C, D |
| r'_[AB] | Hides gcd ( a'_B, b'_B, r_[AB](a − b) ) by addition | A, C |
| r"_[AB] | Hides gcd ( a'_B, b'_B, r_[AB](a − b) ) by addition | A, D |
| r_a | Re-randomization of shares of a | C |
| r_b | Re-randomization of the shares of b | D |
| a_A | Alice's share of the input variable a | A |
| a'_B | B's share of the input variable a, blinded by r_[AB] and r'_[AB] | A, C |
| b_A | A's share of the input variable b | A |
| b'_B | B's share of the input variable b, blinded by r_[AB] and r"_[AB] | B |
| a_A[CA] | previous first split value of first system A from first previous comparison between A and C | A |
| a_C[CA] | previous first split value of third system C from first previous comparison between A and C | C |
| b_D[BD] | previous second split value of fourth system D from second previous comparison between B and D | D |
| b_B[BD] | previous second split value of the second system B from second previous comparison between B and D | B |
| R[AB] | Result of the comparison between A and B | A, B |

Fig. 7

METHODS AND SYSTEMS FOR MULTI-PARTY SORTING OF PRIVATE VALUES

CLAIM OF PRIORITY

The present patent application claims the priority benefit of the filing date of European Application (EPO) No. 06005285.9 filed Mar. 15, 2006, the entire content of which is incorporated herein by reference.

TECHNICAL FIELD

This application generally relates to the field of electronic data processing and more particularly to data encryption.

BACKGROUND AND PRIOR ART

In recent years, processing of electronic data has increased continuously. With the processing of the data also the exchange of the data has increased. This is also true for data that have to be protected against unauthorized reading or writing of the data. For this, encryption systems have been developed that are widespread, for example, public key encryption systems.

Private data are data that an owner of the private data does not want to share with a further party. Such private data may for example be legally protected because they may belong to a protected privacy area of a person. In a further example, such private data may also be business data that are confidential.

Sorting private values of different parties involves comparing the private values and conserve privacy of the private values. Yao's millionaires' problem involves a comparison of private data between two parties. In an article with title "Protocols for Secure Computations" for the Proceedings of the annual IEEE Symposium on Foundations of Computer Science 23, 1982, A. Yao defined the millionaires' problem: two millionaires want compare an amount of money that each one has without revealing the amount of money to each other. A plurality of solutions has been suggested to Yao's millionaires' problem some of which involve a third party. Such a third party has to be found by the two millionaires and may not be available. Two-party solutions involve only the two parties that own the two private values that are desired to be compared. Solutions of Yao's millionaires' problem may be used as a building block for sorting of private values from more than two parties. However, solutions of Yao's millionaires' problem require an amount of computational resources that may be high and using the solutions as the building block for sorting may be inefficient for more than two parties.

BRIEF DESCRIPTION OF DRAWINGS

FIG. 7 is an overview of values used by various embodiments.

DETAILED DESCRIPTION

Figure 1:
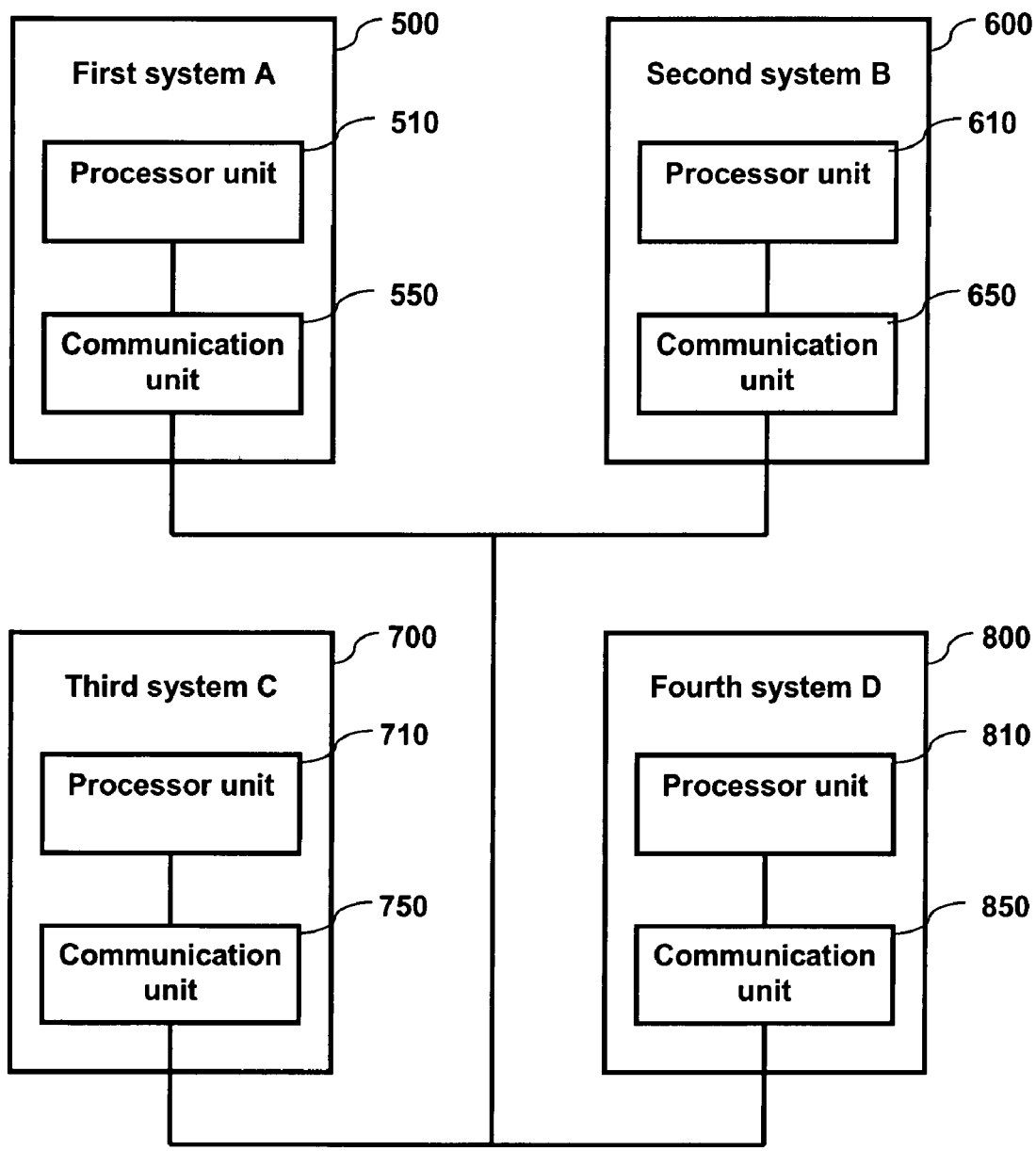
FIG. 1 is a simplified overview of four embodiments and their relations.

Following examples and exemplary embodiments may have specific features for illustrative purposes. The specific features are not intended to limit the scope of the invention or to be exhaustive regarding embodiments of the invention.

A first example aspect relates to a first party of a sorting network that includes more than two parties. The first party has a first private value and provides the first private value for a comparison with a second private value. More particularly, the first aspect includes providing a contribution to the first private value for the comparison so that private values of parties of the sorting network remain private.

The first aspect is addressed in a first method executed by the first party. The first method includes method operations that are part of a comparison protocol that may include four parties of the sorting network. Within the comparison protocol the first method provides the contribution to the first private value, that is, a portion of the first private value. The first method uses and exchanges representations of values that are such that the first party may not be able to learn private values of further parties and that the first party may be able to conserve a private value. The comparison protocol may be used as a building block for sorting values of parties of the sorting network. The comparison protocol is efficient, that is, high-performance. The reason is that few numerical computations with time-consuming calculations are included in the comparison protocol compared to typical solutions of Yao's millionaires' problem. Therefore, the comparison protocol and the first method may be executed faster for example by computer systems than using solutions of Yao's millionaires' problem. Furthermore, results from an execution of the comparison protocol may be used for following executions of the comparison protocol. Therefore, the comparison protocol may be high-performance because results can be reused.

A second example aspect relates to a second party of the sorting network. The second party has a contribution to the second private value and computes the comparison of the first private value and the second private value. The second aspect includes computing the comparison so that the private values of the parties of the sorting network remain private.

The second aspect is addressed in a second method executed by the second party. The second method includes method operations that are part of the comparison protocol. The second method uses, exchanges, and compares representations of values that are such that the second party may not be able to learn private values of further parties and that the second party may be able to conserve a private value. The second method is efficient and may be executed faster than solutions of Yao's millionaires' problem because few numerical computations with time-consuming calculations are included.

A third example aspect relates to a third party of the sorting network. The third party provides a contribution to the first private value, that is, a portion of the first private value so that the private values of the parties of the sorting network remain private.

The third aspect is addressed in a third method executed by the third party. The third method includes method operations that contribute to the comparison protocol. The third method uses and exchanges representations of values that are such that the third party may not be able to learn private values of further parties and that the third party may be able to conserve a private value. The third method is efficient because few numerical computations with time-consuming calculations are included and results of previous computations are reused.

A fourth example aspect relates to a fourth party of the sorting network. The fourth party provides a contribution to the second private value, that is, a portion of the second private value so that the private values of the parties of the sorting network remain private.

The fourth aspect is addressed in a fourth method executed by the fourth party. The fourth method includes method operations that contribute to the comparison protocol. The fourth method uses and exchanges representations of values that are such that the fourth party may not be able to learn private values of further parties and that the fourth party may be able to conserve a private value. The fourth method is efficient because few numerical computations with time-consuming calculations are included and results of previous computations are reused.

A fifth example aspect relates to the first party and more particularly to a system configured to provide the contribution to the first private value for the comparison so that private values of parties of the sorting network remain private.

A first system addresses the fifth aspect and has features that correspond to features of the first method. Accordingly, the first system has desired high-performance properties of the first method.

A sixth example aspect relates to the second party and more particularly to a system configured to compute the comparison so that private values of parties of the sorting network remain private.

A second system addresses the sixth aspect and has features that correspond to features of the second method. Accordingly, the second system has desired high-performance properties of the second method.

A seventh example aspect relates to the third party and more particularly to a system configured to provide the contribution of the third party to the first value so that private values of parties of the sorting network remain private.

A third system addresses the seventh aspect and has features that correspond to features of the third method. Accordingly, the third system has desired high-performance properties of the third method. The third system is disclosed in independent claim 20.

An eighth example aspect relates to the fourth party and more particularly to a system configured to provide the contribution to the second value so that private values of parties of the sorting network remain private.

A fourth system addresses the eighth aspect and has features that correspond to features of the fourth method. Accordingly, the fourth system has desired high-performance properties of the fourth method.

Further aspects include computer program products that are configured to implement processes on computer systems with features of the first method, the second method, the third method, and the fourth method.

FIG. 1 is a simplified overview of four embodiments and their relations. The four embodiments are a first system A 500, a second system B 600, a third system C 700, and a fourth system D 800. The four embodiments are communicatively linked and such a link is represented by lines between components of the four embodiments. The four embodiments are part of a network that may include further systems. Further systems and links to further systems may be added to the four embodiments as will be appreciated by a person skilled in the art. The network may be a sorting network that is configured to sort private values of members of the sorting network. The network may be a part of a larger network of connected systems.

The systems A, B, C, and D may be computer systems or a server and may belong for example to different companies or to different organizations within one or more companies. The systems A, B, C, and D may be linked through the Internet or through an intranet. The owner of the first system A is a first party, the owner of the second system B is a second party, the owner of the third system C is a third party, and the owner of the fourth system is a fourth party.

In a network such as for example the sorting network the systems may be owned by parties that may desire to sort private values to which the parties have access. Sorting the private values may include a plurality of comparisons between different pairs of private values. In each comparison of a pair of private values, that is, of two private values roles of parties participating in the comparison may change and systems participating in the comparison may change, too. In an example, the first party owning the first system in the comparison may provide a contribution to values for a further comparison in a role that may be identified with the role of the third party in the present comparison. In such a way a sequence of comparisons may be done and each party of the network may use a system according to any one of the embodiments. A result of a sequence of comparisons may for example be a complete sorting of the private values that are owned by the parties of the sorting network. In a further example, a result may be a determination of the largest value, the smallest value, or the median value of the private values. Such values together with further statistical values computed from the private values may be used for example for benchmarking purposes. A party of the sorting network may for example desire to benchmark one or more private values that may represent economical data such as revenue or technical data such as energy consumption with corresponding private values of further parties. For this, embodiments may be used without relying on a further party that has to be trusted by the party and that has access to private values of different parties.

The four embodiments may make contributions to comparing private values of the first system A 500 and the second system B 600. The third system C 700 and the fourth system D 800 may be identified as being systems that have participated in previous comparisons of private values of the first system A 500 and the second system B 600. In a network of three systems the third system C and the fourth system may be identical.

The first system 500 includes a processor unit 510 and a communication unit 550 that are communicatively linked. A link between the processor unit 510 and the communication unit 550 may be an interface that is configured to provide an exchange of data in either direction. The processor unit 510 may include a central processing unit (CPU) that may have an access to a memory, for example, a random access memory (RAM). The memory may be used to store and retrieve data and instructions for computations of the CPU. The communication unit 550 may for example include a communication program that is configured to exchange data between the first system 500 and further systems of the network. The communication unit may further include an interface to connect to a system for transferring data, for example, the Internet. The interface may for example be a plug for an Ethernet cable or a plug for a router.

The second system B 600 has a processor unit 610 and a communication unit 650 that may have embodiments that are identical with embodiments of the first system A. In a further example, embodiments of the second system B and units of the second system B may be different from embodiments of the first system A and units of the first system A. As an example, the first system A may be a computer system such as a personal computer and the second system B may be an application server configured to run application programs.

The third system C 700 has a processor unit 710 and a communication unit 750. In an example, embodiments of the third system C may be identical to embodiments of any one of the first system A or the second system B. In a further example embodiments of different systems may different.

The fourth system D 800 has a processor unit 810 and a communication unit 850. The embodiments related to the fourth system D may be identical to or different from embodiments of further systems.

The first system A, the second system B, the third system C, and the fourth system D may have further features that are specified in later paragraphs. In following paragraphs features of methods are specified that relate to the parties owning the systems of the overview.

Figure 2:
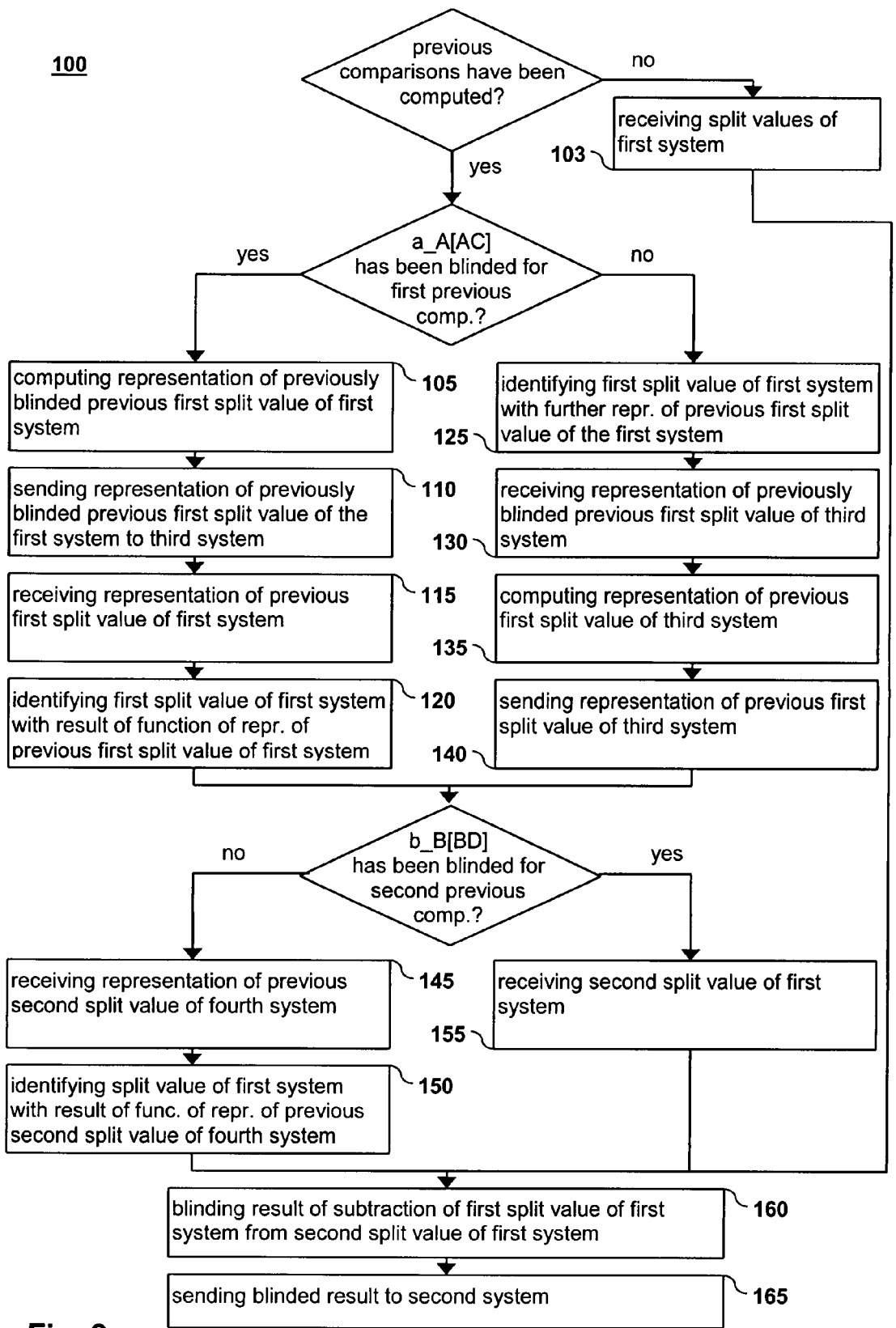
FIG. 2 is a flow diagram with method operations of a first embodiment.

FIG. 2 is a flow diagram with method operations of a first embodiment. The first embodiment is a computer-implemented first method 100 that in the example is executed by the first system A 500. The first method provides a blinded result of a subtraction of a first split value a_A (see FIG. 7) of the first system A 500 from a second split value b_A (see FIG. 7) of the first system A 500 for a comparison. The blinded result includes a contribution to the first private value. The comparison is done by the second system B 600 and involves a blinded first split value a'_B (see FIG. 7) of the second system B 600 and a blinded second split value b'_B (see FIG. 7) of the second system B 600. Method operations of the first method may be executed in an order that is different from the described order. This is also valid for method operations of further following methods.

The first method includes method operations that are part of a comparison protocol in which different systems collaborate. The different systems may include the first system A and the second system B and in case of previous comparisons the third system C and the fourth system D. In case of previous comparisons the first system A has the first private value a and the second system B has the second private value b.

The comparison protocol may be introduced by stating that the first private value is split into a first split value of the first system and a first split value of the second system. The sum of the first split value of the first system and the first split value of the second system may be identified with the first private value. Similarly, the second private value is split into a second split value of the first system and a second split value of the second system. The sum of the second split value of the first system and the second split value of the second system may be identified with the second private value. Splitting the private values may include computing representations that conserve a privacy of the private values. Furthermore, the representations are calculated so that from a comparison of the representations follows a result of a comparison of the first private value and the second private value. Within the comparison protocol the first system A may have access to the first split value of the first system and the second split value of the first system. The second system B may have access to a representation of the first split value of the second system and the second split value of the second system. The split values of the first system and the second system may be computed based on split values of previous comparisons that may be partly provided by the third system C and the fourth system D.

The first method 100 may include a check if previous comparisons have been computed. The previous comparisons include a first previous comparison between split values of the first system A 500 and the third system C 700 and a second previous comparison between split values of the second system B 600 and the fourth system D 800. In case that the previous comparisons have not been computed the method may include receiving 103 the first split value of the first system A 500 and the second split value of the first system A 500.

In case that the previous comparisons have been computed the method may include a further check if the previous first split value a_A[CA] (see FIG. 7) of the first system A 500 has been blinded for the computed first previous comparison. In a comparison of split values a subset of the split values is blinded and a further subset of the split values is unblinded. A party that has a blinded split value knows only a blinded value of the split value. The blinded value may have been computed for example by using blinding values to modify the split value. Therefore, the party that has the blinded split value may not be able to get to know the split value. In contrast to this an unblinded split value may be identical with the split value and a party that has an unblinded split value may be able to provide directly the split value. In case that split values of a previous comparison are reused for the comparison the split values of the previous comparison may be treated differently in the first method according to a status of having been blinded or not. The check refers to the status of the split values of the first previous comparison.

In case that the previous first split value a_A[CA] of the first system A 500 has been blinded for the computed first previous comparison it may follow: computing 105 a representation of a previously blinded previous first split value a'_A[CA] (see FIG. 6) of the first system A 500, sending 110 the representation of the previously blinded previous first split value of the first system A 500 to the third system 700, receiving 115 a representation of the previous first split value of the first system A 500, and identifying 120 the first split value of the first system A 500 with a result of a function of the representation of the previous first split value of the first system A 500. Identifying 120 may include setting the first split value of the first system A 500 equal to the result of the function.

In case that the previous first split value of the first system A 500 has not been blinded for the computed first previous comparison it may follow: identifying 125 the first split value of the first system A 500 with a further representation of the previous first split value of the first system A 500, receiving 130 a representation of a previously blinded previous first split value a'_C[AC] (see FIG. 8) of the third system C 700, computing 135 a representation of a previous first split value a_C[CA] (see FIG. 7) of the third system C 700, and sending 140 the representation of the previous first split value of the third system C 700 to the second system B 600. Computing 135 the representation of the previous first split value includes reversing a previous blinding of the previous first split value of the third system C 700 and blinding the previous first split value of the third system C 700.

It may follow a further check if the previous second split value b_B[BD] (see FIG. 7) of the second system B 600 has been blinded for the computed second previous comparison. Therefore, the further check finds out which split values of the second previous comparison have been blinded and according to a result following method operations may vary.

Figure 8:
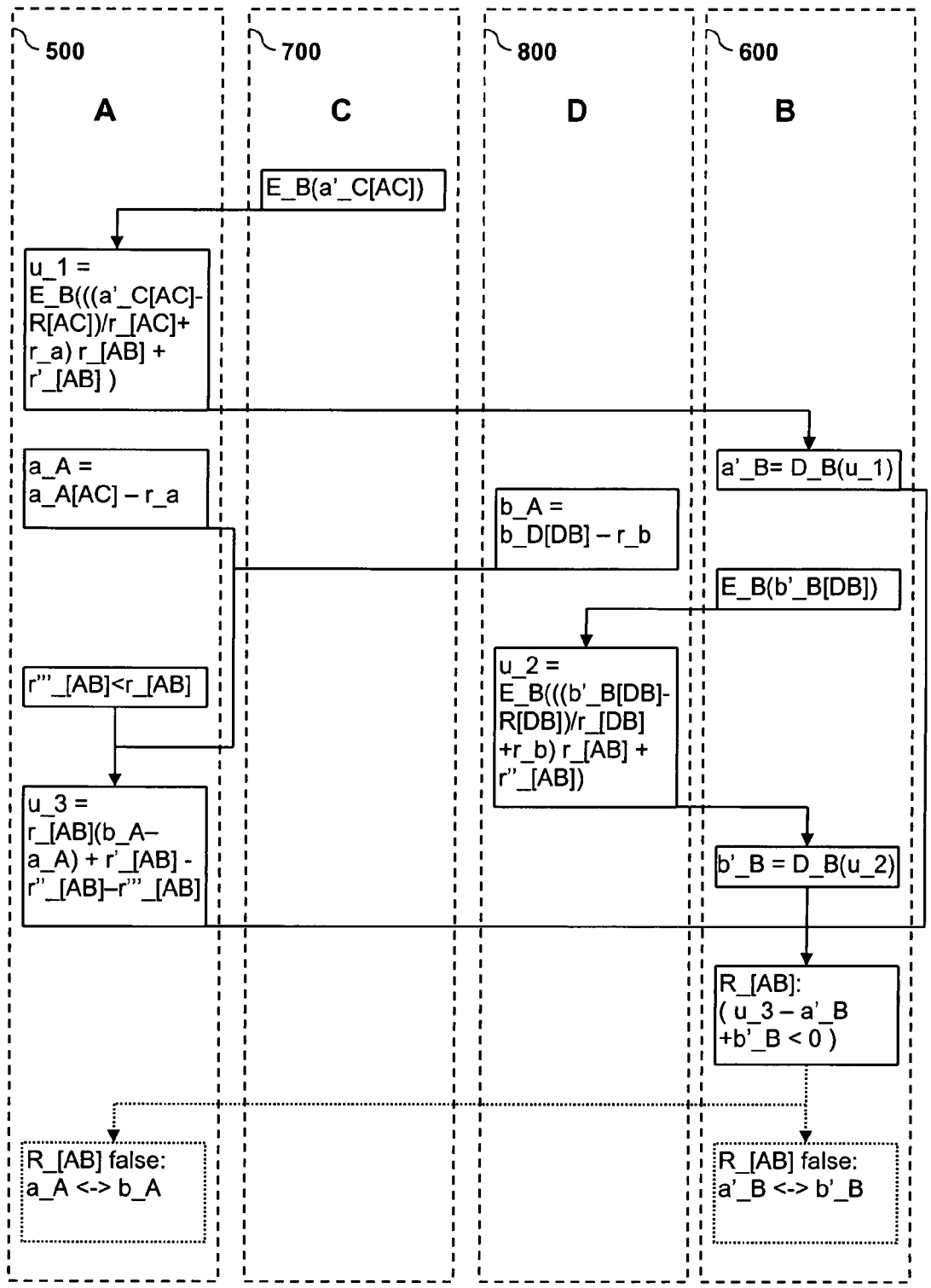
FIG. 8 is a further exemplary situation with embodiments and relations between data of the embodiments.

In case that the previous second split value of the second system B 600 has not been blinded for the computed second previous comparison it may follow: receiving 145 a representation of a previous second split value b_D[BD] (see. FIG. 8) of the fourth system D 800 and identifying 150 the second split value of the first system A 500 with a result of the function of the representation of the previous second split value of the fourth system D 800.

In case that the previous second split value of the second system B 600 has been blinded for the computed second previous comparison it may follow receiving 155 the second split value of the first system A 500.

Therefore, according to the first method the first system A 500 has access to the first split value of the first system and the second split value of the first system. The split values of the first system may be provided for the comparison with the first split value of the second system and the second split value for the second system. The result of the comparison of the split values of the first system and the split values of the second system may be identified with a result of a comparison of the first private value and the second private value. Furthermore, the split values may be calculated in such a way that each system participating in the comparison protocol may be prevented from learning a private value of a further system and a result of a comparison. This is the case for the first system executing operations of the first method because the first system gets knowledge about the split values of the first system. However, the first system may not be able to derive how they have been calculated and what portions of private values of further systems have been used.

It may follow blinding 160 the result of the subtraction of the first split value of the first system A 500 from the second split value of the first system A 500 and sending 165 the blinded result to the second system B 600. Blinding 160 the result of the subtraction prevents that the second system may be able to gain knowledge from the provided result about the split values of the first system and may compensate a further blinding of values used in the comparison between the split values of the first system and the split values of the second system.

The first method may compute the further representation of the previous first split value of the first system by subtracting a first variable r_a (see FIG. 7) from the previous first split value of the first system and compute the representation of the previous first split value of the third system by adding the first variable r_a to the previous first split value of the third system. Such computations may be done in case that the previous first split value of the first system has not been blinded for the computed first previous comparison. Therefore, effects of introducing the first variable r_a on the comparison may be able to compensate each other.

Furthermore, blinding the previous first split value of the third system may include multiplying the previous first split value of the third system and the first variable r_a with a first blinding value r_[AB] (see FIG. 7) and adding a second blinding value r_[AB] (see FIG. 7). This may be done in case that the previous first split value of the first system has not been blinded for the computed first previous comparison.

Independently of computed check results it may be that blinding 160 the result of the subtraction of the first split value of the first system from the second split value of the first system includes multiplying the result with the first blinding value r_[AB], adding the second blinding value r'_[AB] to the result, and subtracting a third blinding value r"_[AB] (see FIG. 7) from the result.

Independently of the computed check results the first method may include determining a fourth blinding value r'"_[AB] (see FIG. 6 and FIG. 8) being smaller than the first blinding value r_[AB] and blinding 160 the result of the subtraction by further subtracting the fourth blinding value r'"_[AB] from the result.

The first method may include computing 105 the representation of the previously blinded previous first split value of the first system by encrypting the previously blinded previous first split value of the first system with a homomorphic encryption function. The homomorphic encryption function is a public key encryption function that has a homomorphic feature. A public key encryption function may encrypt data using a specific public key that may be made available to a system or party. Decrypting the encrypted data may be done with a specific decryption function and a private key that is related to the specific public key because it is configured in such a way that it can be used for the encrypted data.

Furthermore, computing the result of the function of the representation of the previous first split value of the first system may be done with the function being a decryption function. The decryption function may be configured to decrypt a value that has been encrypted with the homomorphic encryption function. The method may further include: computing 135 the representation of the previous first split value of the third system using the homomorphic encryption function and computing the result of the function of the representation of the previous second split value of the fourth system with the function being the decryption function.

A homomorphic encryption function is an encryption function for which the following equations describing the homomorphy feature are valid:

$$E(x)E(y)=E((x+y) \bmod n) \text{ and}$$

$$(E(x))^y=E((xy) \bmod n), \text{ with}$$

mod being the modulus function and n being the modulus value of the encryption.

The modulus value n may also be called the Ravest-Shamir-Adleman (RSA) modulus of the encryption and is a part of the public key.

The encryption function E is an example of a public key encryption function that uses a public key to encrypt a value x to give an encrypted value $E(x)$. The encrypted value $E(x)$ may be decrypted using a decryption function D with a private key that is related to the public key. With the private key it is $D(E(x))=x$. There are multiple examples for such encryption functions, however in embodiments of the invention homomorphic encryption functions of encryption systems are used such as Paillier's encryption system, Naccache-Stern encryption system, Okomoto-Uchiyama encryption system, or Benealoh encryption system. Paillier's encryption system, as well as other mentioned examples, has a further feature that may be an optional feature of embodiments of the invention, that is, the homomorphic function is a randomized homomorphic function so that encrypted values are semantically secure. A semantically secure encryption function does not reveal information about the original value through the encrypted value. This provides further security because knowing the encrypted value it is not possible to guess the original value by encrypting trial values and comparing the result for the trial values with the encrypted value. The further security may be desired because in case that the private values are small it may be possible to use trial values to guess a private value. This can be demonstrated in an example: encrypting an original value involves an individual and specific randomization that is not available to further encryptions so that encrypting a trial value may give a different encrypted value even if the trial value is equal to the original value.

Figure 3:
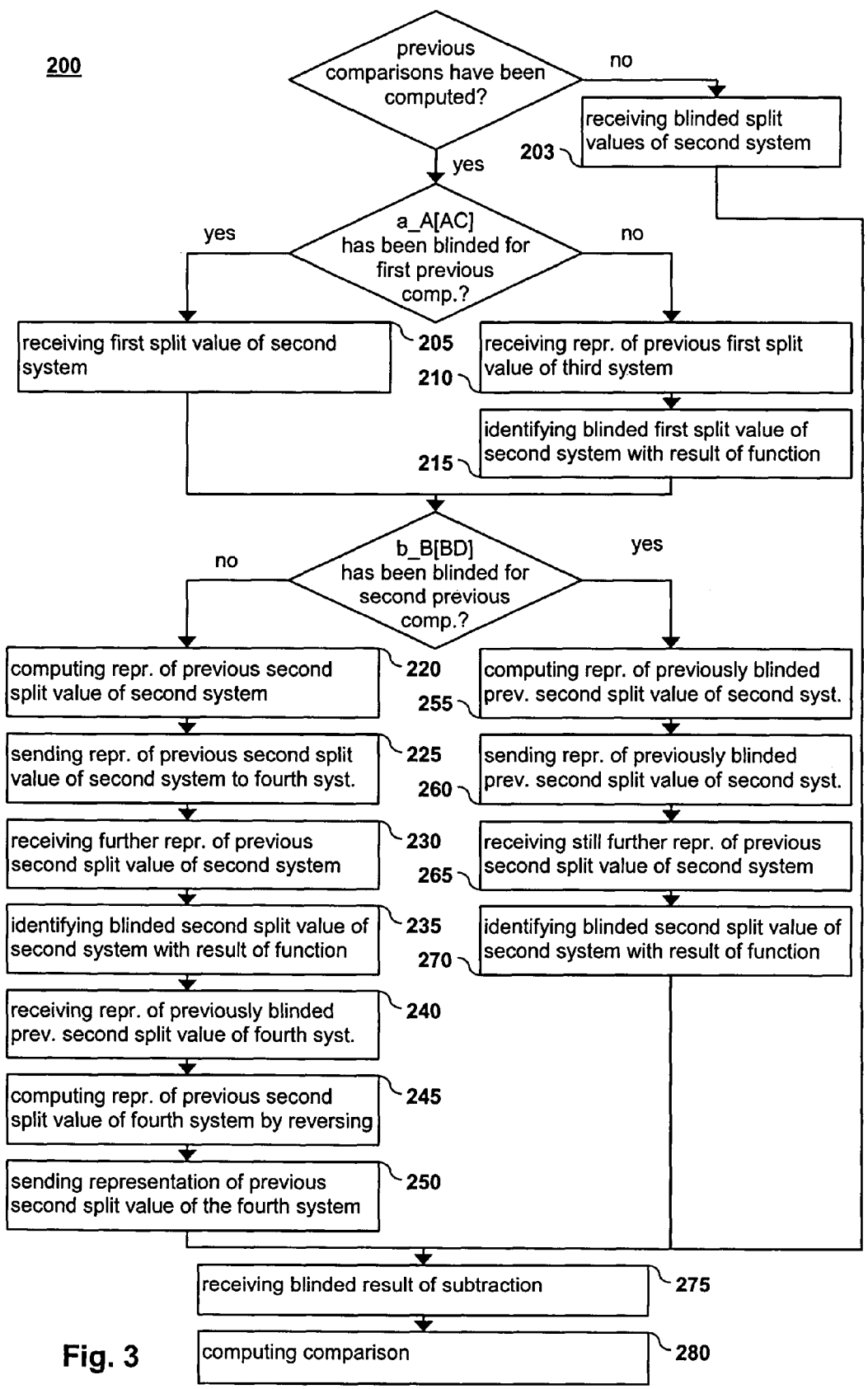
FIG. 3 is a flow diagram with method operations of a second embodiment.

FIG. 3 is a flow diagram with method operations of a second embodiment. The second embodiment is a computer-implemented second method 200 for computing a comparison. In the example, the second method is executed by the second system. The comparison is between split values that have been blinded, that is, between a blinded result of a subtraction and a result of a subtraction of a blinded first split value a'_B of a second system B from a blinded second split value b'_B of the second system B. The blinded result of the subtraction includes the first split value of the first system that has been subtracted from the second split value of the first system. The blinded result of the subtraction may have been received from a further system. The blinded split values further include a result of a subtraction of a blinded first split value a'_B of the second system from a blinded second split value b'_B of the second system.

The second method 200 may include the check if the first previous comparison and the second previous comparison have been computed.

In case that the first previous comparison and the second previous comparison have not been computed the second method may include receiving 203 the blinded first split value of the second system and the blinded second split value of the second system.

In case that the first previous comparison and the second previous c comparison have been computed the second method may include the further check. The further check computes if the previous first split value a_A[CA] of the first system has been blinded for the computed first previous comparison.

In case that the previous first split value a_A[CA] of the first system has been blinded for the computed first previous comparison it may follow receiving 205 the first split value of the second system.

In case that the previous first split value a_A[CA] of the first system has not been blinded for the computed first previous comparison it may follow: receiving 210 a representation of a previous first split value a_C[AC] (see FIG. 7) of the third system and identifying 215 the blinded first split value of the second system with a result. The result may be computed with a function of the representation of the previous first split value of the third system.

It may follow the further check if the previous second split value b_B[BD] of the second system has been blinded for the computed second previous comparison.

In case that the previous second split value of the second system has not been blinded for the computed second previous comparison it may follow: computing 220 a representation of a previous second split value of the second system, sending 225 the representation of the previous second split value of the second system to the fourth, receiving 230 a further representation of the previous second split value of the second system, identifying 235 the blinded second split value of the second system with a result of a function of the further representation of the previous second split value of the second system, receiving 240 a representation of a previously blinded previous second split value of the fourth system, computing 245 a representation of a previous second split value of the fourth system by reversing a previous blinding of the previous second split value of the fourth system, and sending 250 the representation of the previous second split value of the fourth system to the fourth system.

In case that the previous second split value of the second system has been blinded for the computed second previous comparison it may follow: computing 255 a representation of a previously blinded previous second split value of the second system, sending 260 the representation of the previously blinded previous second split value of the second system to the fourth system, receiving 265 a still further representation of the previous second split value of the second system, and identifying 270 the blinded second split value of the second system with a result of a function of the still further representation of the previous second split value of the second system.

Independently of results of prior checks the second method may include receiving 275 the blinded result of the subtraction of the first split value of the first system from the second split value of the first system and computing 280 the comparison. The comparison may be a check if a result of subtracting the blinded first split value of the second system from the received blinded result and adding the blinded second split value of the second system is less than a value representing a value of zero. In an example, the value representing the value of zero may be identical to the value of zero. In a further example, the value representing the value of zero may be small value that is close to the value of zero and may be determined so that rounding errors of computations are taken into account.

In case that the previous first split value of the first system has not been blinded for the computed first previous comparison the second method may compute the result of the function of the representation of the previous first split value of the third system with the function being a decryption function. The decryption function may be configured to decrypt a value that has been encrypted with the homomorphic encryption function. The second method may further include: computing 220 the representation of the previous second split value of the second system by encrypting the previous second split value of the second system with the homomorphic encryption function, computing the result of the function of the further representation of the previous second split value of the second system with the function being the decryption function, and computing 245 the representation of the previous second split value of the fourth system using the homomorphic encryption function.

In case that the previous first split value of the first system has been blinded for the computed first previous comparison the second method may include: computing 255 the representation of the previously blinded previous second split value of the second system by encrypting the previously blinded previous second split value of the second system with the homomorphic encryption function and computing the result of the function of the still further representation of the previous second split value of the second system with the function being the decryption function.

Figure 4:
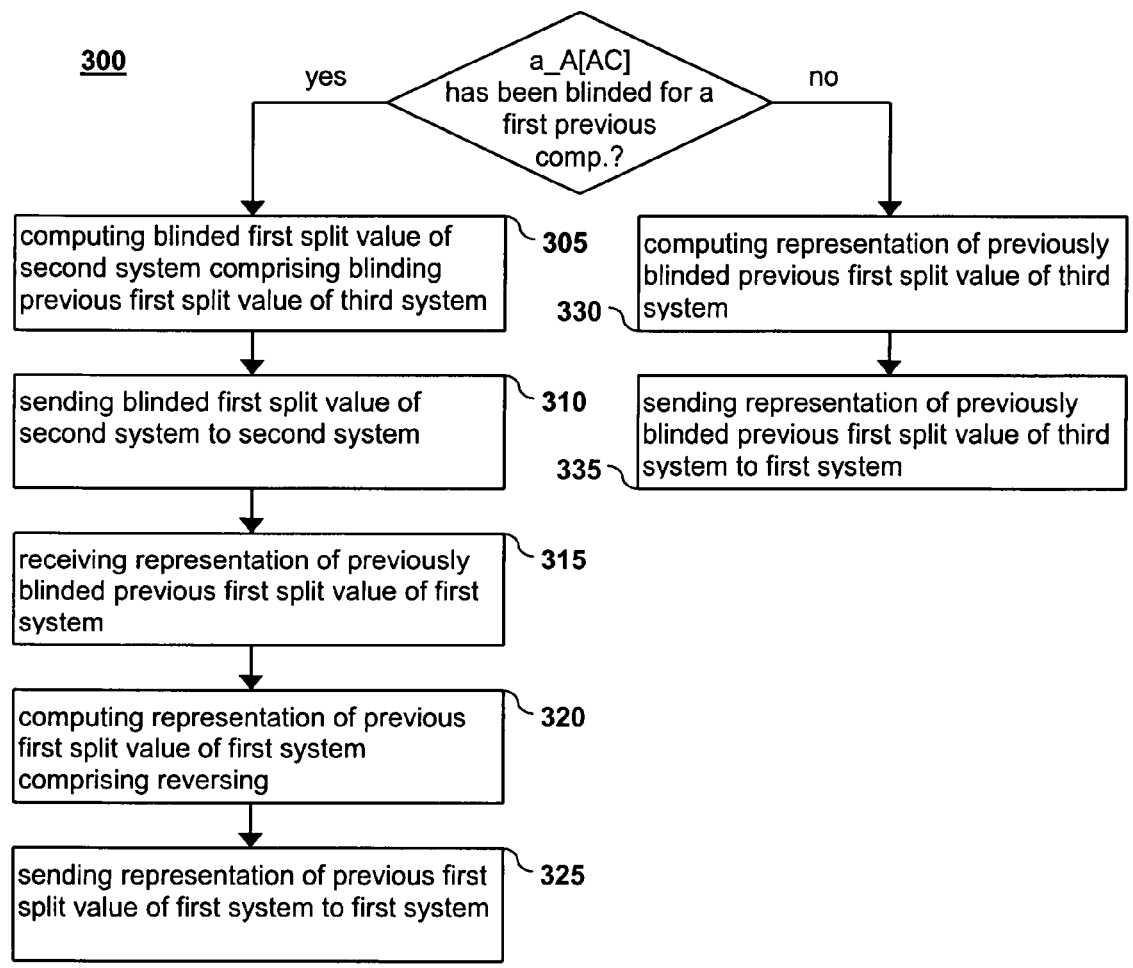
FIG. 4 is a flow diagram with method operations of a third embodiment.

FIG. 4 is a flow diagram with method operations of a third embodiment. The third embodiment is a computer-implemented third method 300 for providing a contribution to a comparison of split values. In the example, the third method is executed by the third system. The contribution may be only available for being provided in case that the first previous comparison and the second previous comparison have been computed.

The third method may include the check if the previous first split value a_A[CA] of the first system has been blinded for the computed first previous comparison.

In case that the previous first split value a_A[CA] of the first system has been blinded for the computed first previous comparison the third method may include: computing 305 a blinded first split value of a second system by blinding the previous first split value of the third system, sending 310 the blinded first split value of the second system to the second system, receiving 315 a representation of a previously blinded previous first split value of the first system, computing 320 a representation of the previous first split value of the first system by reversing a previous blinding of the previous first split value of the first system and sending 325 the representation of the previous first split value of the first system to the first system.

In case that the previous first split value a_A[CA] of the first system has not been blinded for the computed first previous comparison the third method may include computing 330 a representation of the previously blinded previous first split value of the third system and sending 335 the representation of the previously blinded previous first split value of the third system to the first system A.

Furthermore, blinding the previous first split value of the third system may include subtracting the first variable r_a from the previous first split value of the third system prior to blinding the previous first split value of the third system. In such a case computing 320 the representation of the previous first split value of the first system may include adding the first variable r_a to the previous first split value of the third system. Therefore, effects of introducing the first variable r_a on the comparison according to the second method may be able to compensate each other.

The third method may include blinding the previous first split value of the third system by multiplying the previous first split value of the third system decreased by the first variable r_a with the first blinding value r_[AB] and by adding the second blinding value r'_[AB]. This may be so in case that the previous first split value of the first system has been blinded for the computed first previous comparison.

Furthermore the third method may include computing 320 the representation of the previous first split value of the first system using a homomorphic encryption function. This may be so in case that the previous first split value of the first system has been blinded for the computed first previous comparison. The third method may further include computing 330 the representation of the previously blinded previous first split value of the third system by encrypting the previously blinded previous first split value of the first system with the homomorphic encryption function. This may be so in case that the previous first split value of the first system has not been blinded for the computed first previous comparison.

Figure 5:
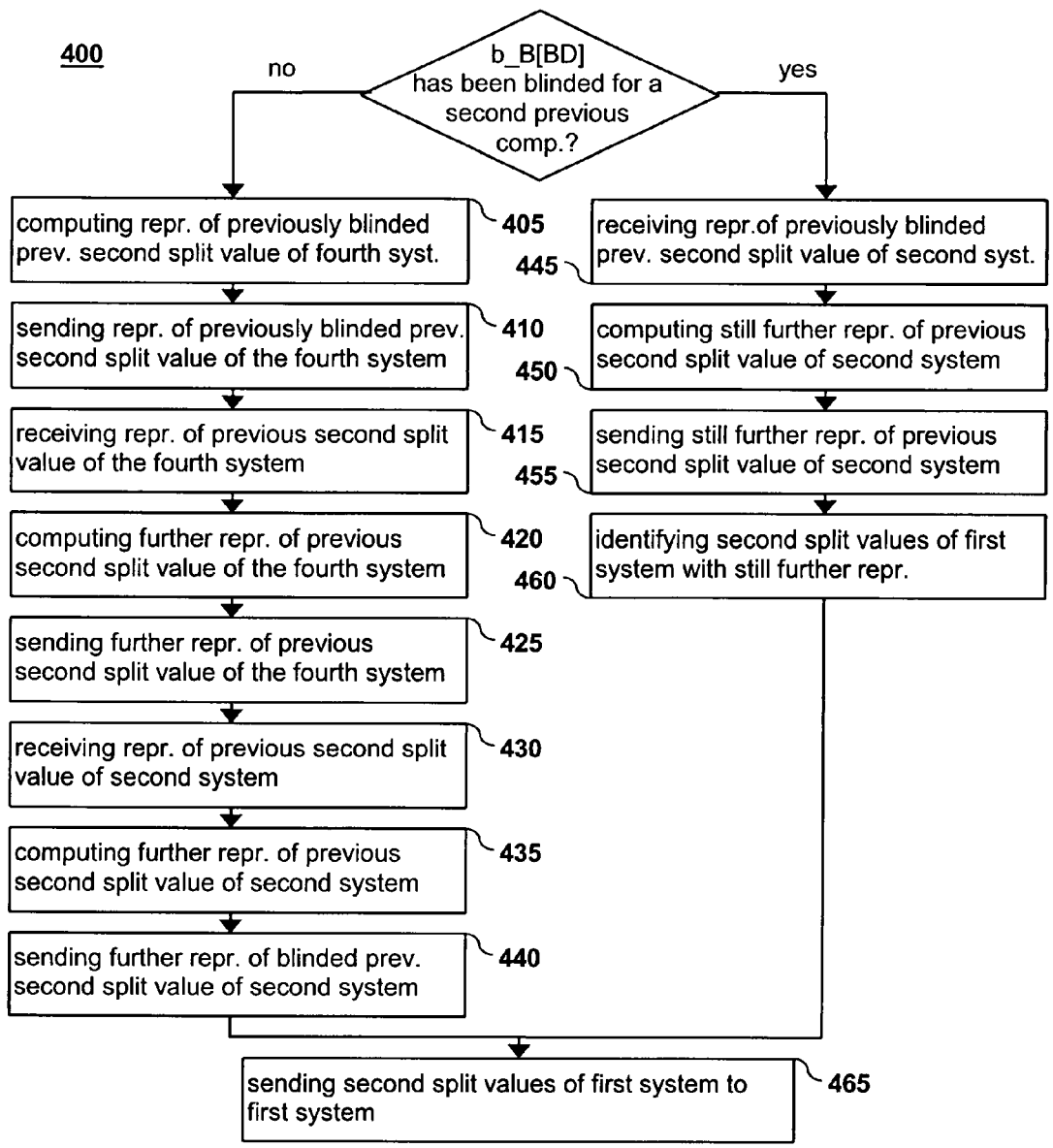
FIG. 5 is a flow diagram with method operations of a fourth embodiment.

FIG. 5 is a flow diagram with method operations of a fourth embodiment. The fourth embodiment is a computer-implemented fourth method 400 for providing a contribution to the comparison of split values. In the example, the fourth method is executed by the fourth system.

The fourth method may include the further check if the previous second split value of the second system has been blinded for the computed second previous comparison. The contribution may be only available for being provided in case that the first previous comparison and the second previous comparison have been computed.

In case that the previous second split value of the second system has not been blinded for the computed second previous comparison the fourth method may include: computing 405 the representation of a previously blinded previous second split value of the fourth system, sending 410 the representation of the previously blinded previous second split value of the fourth system to the second system, receiving 415 the representation of the previous second split value of the fourth, computing 420 the further representation of the previous second split value of the fourth system from the representation of the previous second split value of the fourth system, sending 425 the further representation of the previous second split value of the fourth system to a first, receiving 430 the representation of the previous second split value of the second system, computing 435 the further representation of the previous second split value of the second system by blinding the previous first split value of the third system, and sending 440 the further representation of the blinded previous second split value of the second system to the second system.

In case that the previous second split value of the second system has been blinded for the computed second previous comparison the fourth method may include: receiving 445 the representation of a previously blinded previous second split value of the second system, computing 450 the still further representation of the previous second split value of the second system by reversing a previous blinding of the previous second split value of the second system and blinding the previous second split value of the second system, sending 455 the still further representation of the previous second split value of the second system to the second system, and identifying 460 the second split values of the first system with a still further representation of the previous second split value of the fourth system D]).

Independently of a result of the further check it may follow sending 465 the second split values of the first system to the first system.

In case that the previous second split value of the second system has not been blinded for the computed second previous comparison the fourth method may further include: computing 420 the further representation of the previous second split value of the fourth system by subtracting the second variable r_b from the previous second split value of the fourth system and computing 435 the further representation of the blinded previous second split value of the second system by adding the first variable r_b to the previous second split value of the second system.

In case that the previous second split value of the second system has been blinded for the computed second previous comparison the fourth method may include: computing 450 the still further representation of the previous second split value of the second system by adding the first variable r_b to the previous second split value of the second system prior to blinding the previous second split value of the second system and computing the still further representation of the previous second split value of the fourth system by subtracting the second variable r_b from the previous second split value of the fourth system.

The fourth method may blind the previous second split value of the second system by multiplying the previous second split value of the second system and the second variable with the first blinding value r_[AB]. Furthermore, a third blinding value r"_[AB] may be added to the product. This may be in case that the previous second split value of the second system has not been blinded or has been blinded for the computed second previous comparison.

The fourth method may use the homomorphic encryption function for computing 405 the representation of the previously blinded previous second split value of the fourth system. This may be done by encrypting the previously blinded previous second split value of the fourth system with the homomorphic encryption function. This may be done in case that the previous second split value of the second system has not been blinded for the computed second previous comparison. However, in case that the previous second split value of the second system has not been blinded for the computed second previous comparison the fourth method may use the homomorphic encryption function for computing 435 the further representation of the previous second split value of the second system.

Figure 6:
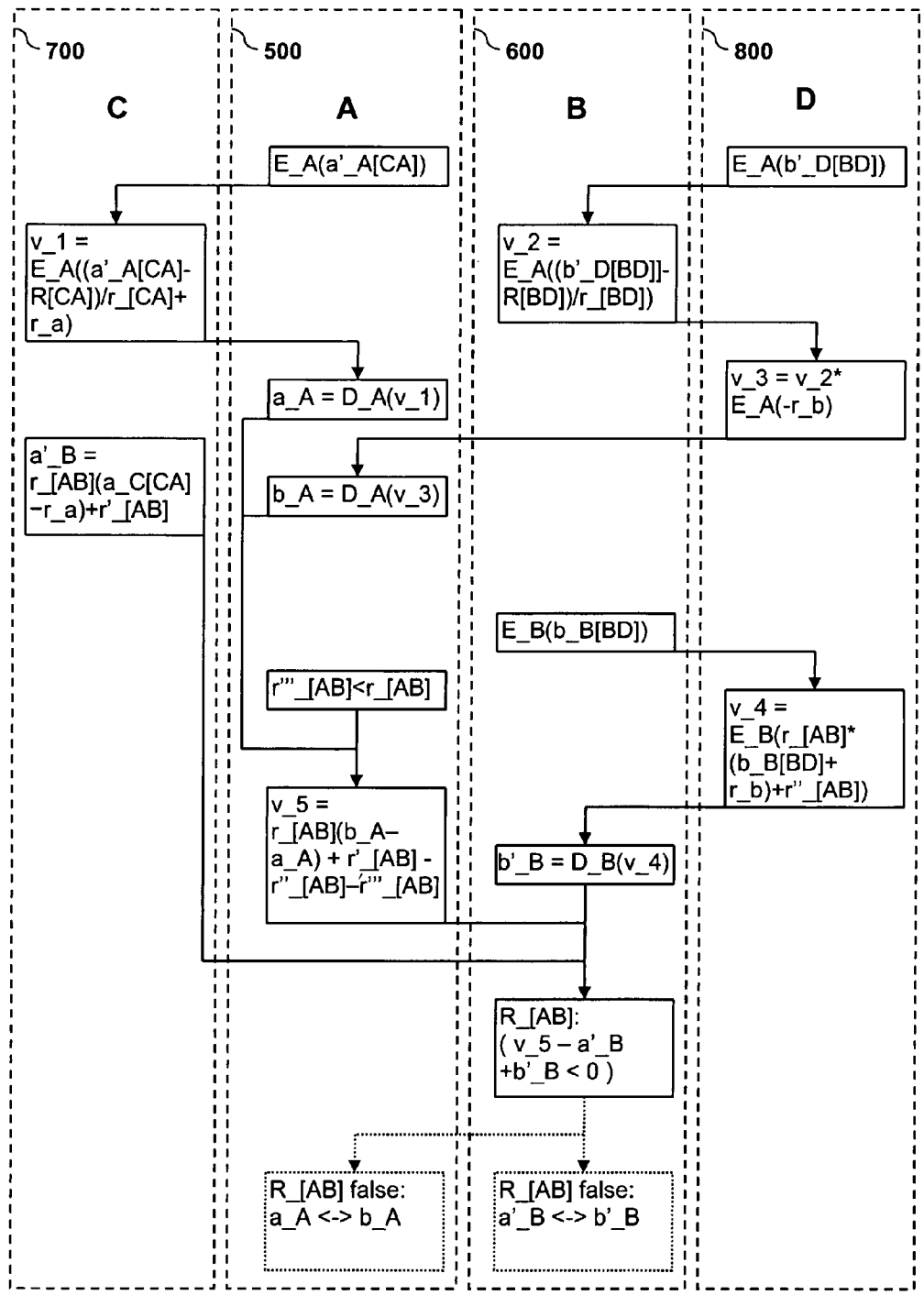
FIG. 6 is an exemplary situation with embodiments and relations between data of the embodiments.

FIG. 6 is an exemplary situation with embodiments and relations between data of the embodiments. The exemplary situation may be characterized by following facts: the first previous comparison and the second previous comparison have been computed, for the first previous comparison the previous first split value a_A[AC] of the first system has been blinded, and for the second previous comparison the previous second split value b_B[BD] of the second system has not been blinded.

The embodiments being a part of the exemplary situation are the first system A 500, the second system B 600, the third system C 700, and the fourth system D 800. The exemplary situation further includes data items that are accessed, computed, or exchanged between different systems. The data items are represented by boxes and the data items are according to embodiments of the invention. A data item may include a standardized data format that is configured to be exchanged between embodiments. The data item may also include further data such as information about the sender or the receiver of the data item. The data item may be sent in a secure way so that unauthorized parties may not be able to understand or to forge the data item. An arrow between data items indicates a relation between the data items, that is, a first data item represents a contribution, that is, an input to the second data item to which the arrow points. It may be that more than one arrow points to a data item indicating more than one contribution may be used for example to compute the data item.

Describing the exemplary situation may be started with a data item of the first system A 500. According to an embodiment of the invention the first system A has encrypted the previously blinded previous first split value a'_A[AC] of the first system with the homomorphic encryption function E_A. The result of the encryption is E_A(a'_A[AC]) is the representation of the a'_A[AC] and is included in the data item. The data item may be sent to the third system C and used there to compute a value v__1=E_A((a'_A[CA]−R[CA])/r_[CA]+r_a). Using the homomorphy feature of the encryption function it is possible to add a value to an argument of the encryption function by multiplying it with an encryption of the value. Furthermore, using the homomorphy feature of the encryption function it is possible to multiply an argument of the encryption function with a value by computing the encrypted argument to the power of the value. Therefore, arguments of the encryption function may be used for computations without having knowledge about the arguments.

The value v__1 may be identified with the representation of the previous first split value of the first system. v__1 may be further identified with an encrypted value of previously blinded previous first split value a'_A[AC] of the first system from which the previous blinding of the first comparison has been removed and for which a further representation has been computed for the comparison. The previous blinding has been removed by subtracting R[CA] from a'_A[AC], wherein R[CA] is a value that is identical to r"_[CA] in case that the first previous comparison has given a true result. A true result may be identified with a fact that a computed value including blinded split values according to embodiments has been smaller than a value identical for example with zero. In case that the first previous comparison has been computed and not given the true result R[CA] is identical to r'_[CA]. Such a distinction depending on obtaining the true result is required to compensate a previous swapping of values according to embodiments in the previous blinding. Removing the blinding from a'_A[AC] may be finished by dividing the a'_A[AC]−R[CA] by r_[CA] that may be identified with a first blinding variable of the first previous comparison.

Furthermore, following a removal of the previous blinding of a'_A[AC] the first value r_a is added to hide an unblinded value from the first system A that the first system A may have seen previously. Such a hiding of values prevents A from learning information about private values by comparing received values in course of a sorting.

A data item including v__1 may be sent to the first system A and may be decrypted by system A to give the first split value a_A of the first system. In other words a_A may be identified with the result of the function, that is, the decryption function of the previous first split value of the first system. A data item including a_A may then contribute to compute v__5 that may be identified with the blinded result of the subtraction of the first split value of the first system a_A from the second split value of the first system b_A.

In the exemplary situation and according to embodiments the first system A receives from the fourth system D 800 a data item with a value v__3. v__3 may be identified with the representation the previous second split value of the fourth system. By decrypting v__3 with the decryption function configured to decrypt values that have been encrypted by the encryption function E_A the second split value of the first system b_A can be computed. In other words, the second split value of the first system b_A is identified with a result of the function of the representation of the previous second split value of the fourth system. A data item including b_A contributes to v__5.

The value v__5 is computed using the first blinding variable r_[AB], the second blinding variable r'_[CA], the third blinding variable r"_[CA], and the fourth blinding variable r'"_[CA] to give v__5=r_[AB](b_A−a_A)+r'_[AB]−r"_[AB]−r'"_[AB]. The fourth blinding variable r'"_[CA] has been determined by the first system A so that the fourth blinding variable r'"_[CA] is smaller than the first blinding variable r_[CA]. A data item with v__5 may be sent to the second system B.

In the exemplary situation the third system C provides a further contribution based on a value that is related to the first previous comparison. The further contribution may be identified with the blinded first split values of the second system a'_B. It may be a'_B=r_[AB](a_C[CA]−r_a)+r'_[AB], using the blinding values and r_a so that the blinding of the split values of the comparison compensate each other. A data item with the computed a'_B is sent to the second system B.

In the exemplary situation the fourth system D has the previously blinded previous second split value b'_D[BD] of the fourth system from the second previous comparison. The fourth system D computes a representation of the previously blinded previous second split value b'_D[BD] of the fourth system and sends the representation included in a data item to the second system B.

The second system receives the representation of the previously blinded previous second split value b'_D[BD] of the fourth system and computes v__2. v__2 is a further representation of the previously blinded previous second split value b'_D[BD] of the fourth system. v__2 is computed by reversing the previous blinding, that is, v__2=E_A((b'_D[BD]]−R[BD])/r_[BD]), wherein r_[BD] may be identified with the first blinding variable of the second previous comparison. R[BD] depends on a result of a computation if in the second previous comparison the expression of the blinded split values has been less than a value identified with zero. In case the result is true R[BD] is identical to r"[CA] that may be identified with the third blinding variable of the second previous comparison. In case the result is not true R[BD] is identical to r'[CA] that may be identified with the second blinding variable of the second previous comparison. In this way the previous blinding is reversed and v__2 may be sent as the representation of the previous second split value b_D[BD] of the fourth system to the fourth system D.

The fourth system D may receive V_2 and compute v_3 by v_3=v_2*E_A(−r_b). v_3 may be identified as the further representation of the previous second split value b_D[BD] of the fourth system that is computed by subtracting the second variable r_b from the previous second split value b_D[BD] of the fourth system. v_3 may be sent as a part of a data item to the first system A.

The second system has the previous second split value b_B[BD] of the second system and computes a representation of it by encrypting it with the homomorphic encryption function E_B. The result E_B(b_B[BD]) may be included in a data item that is sent to the fourth system D.

The fourth system receives the representation of the previous second split value b_B[BD] of the second system and computes v_4, that is, the further representation of the previous second split value b_B[BD] of the second system. It is v_4=E_B(r_[AB]*(b_B[BD]]+r_b)+r"_[AB]), that is, the blinding variables and r_b are used to blind and hide the previous second split value b_B[BD] of the second system. v_4 may be part of a data item that is sent to the second system B.

The second system B receives v_4, that is, the further representation of the previous second split value b_B[BD] of the second system and identifies the blinded second split value b'_B of the second system B with the result of the decryption function D_B of v_4. The decryption function D_B is configured to decrypt values with a private key that have been encrypted with the encryption function E_B with a public key.

The blinded second split value b'_B of the second system B contributes to a computation of the result R_[AB], that is, if it is (v_5−a'_B+b'_B<0). In other words, the result R_[AB] is the statement that subtracting the blinded second split value b'_B of the second system B and adding the blinded second split value b'_B of the second system B to v_5 is less than a value of zero. Accordingly, the result R_[AB] may be true or may be not true.

In case that the result R_[AB] is true the protocol may be finished and a further comparison including different split values may be started. However, in case that the result R_[AB] is false the second system B may exchange the blinded first split value a'_B of the second system with the blinded second split value b'_B of the second system. Furthermore the first system B may provide the first system A with the result R_[AB]. Accordingly, the first system A may exchange the first split value a_A of the first system with the second split value b_A of the first system. The dotted arrow from the second system to the first system indicates a transfer of data about R_[AB] that may take place in case that R[AB] is false. The first system A may use the transferred data to exchange the values a_A and b_B for example for following protocols. Accordingly, a reversing of blinding of the blinded values a'_B and b'_B has to take into account the result R_[AB]. The result R_[AB] may be considered equivalent to a statement that the second private value from which the first private value is subtracted is less than zero, that is, b−a<0. This is equivalent to a statement that the second private value b is less than the first private value a.

FIG. 7 is an overview of values used by various embodiments. The overview includes the values, purposes and the systems that have knowledge of the values. The blinding values r_[AB], r'_[AB], and r"_[AB] and their use have been described previously. The fourth blinding value r'"_[AB] may be determined by system A and not be sent to any further system. The fourth blinding value r'"_[AB] may be used so that in case of an identity of split values the identity of the split value is blinded.

The blinding values may be random values that may be determined by one system according to a standard computation for random variables. This may include for example using a pseudorandom number generator such as Blum Blum Shub, ISAAC or lagged Fibunacci generators. The one system may send the computed random values to further systems that may access the random values. The blinding values r_[AB], r'_[AB], and r"_[AB] may also be determined by a common cointoss of systems that may access the random values.

The first variable r_a and the second variable may be also random variables determined by a standard way. The first split values that are used in the comparison are a_A and a'_B. The first split value a'_B of the second system B is blinded as is indicated by the prime. Such a convention may be used for split values of previous comparisons, too. The second split values that are used in the comparison are b_A and b'_B, wherein the b'_B is the blinded second split value of the second system. Split values of previous comparisons may for example be the previous first split value a_A[CA] of the first system A from the first previous comparison between systems C and A.

R_[AB] represents the result of the comparison that is part of the protocol. The result of the comparison may be true or not true, that is, false. A true result R_[AB] means that r_[AB](−a_A[CA]−a_C[CA]+b_B[BD]+b_D[BD])−r'"_[AB] is less than zero, as can be computed by inputting the computed values. From this follows with r'"_[AB]<r_[AB] for integer values of the split values that −a_A[CA]−a_C[CA]+b_B[BD]+b_D[BD] is less than zero. Therefore, a sum of the split values of the first previous comparison, a_A[CA] and a_C[CA], are compared to the sum of split values of the second previous comparison, b_B[BD] and b_D[BD]. The sum a_A[CA]+a_C[CA] may be identified with the first private value a and the sum b_B[BD]+b_D[BD] may be identified with the second private value b. Therefore, the true result R_[AB] means that −a+b<0 or equivalently that the second private value is less than the first private value.

Executing method operations of the protocol multiple times between different systems allows for a sorting of the split values of systems participating in the sorting and therefore also of the private values of the systems participating in the sorting. In the sorting the split values of previous comparisons are reused without revealing the private values. Therefore the sorting may save independent computations for each comparison rendering the sorting high-performance, that is, efficient when including multiple comparisons.

FIG. 8 is a further exemplary situation with embodiments and relations between data of the embodiments. The further exemplary situation includes embodiments that are identical to the embodiments of a previous situation (see FIG. 6), that is, the first system A 500, the second system B 600, the third system C 700, and the fourth system D 800. Furthermore, the situation is created following a computation of the first previous comparison and the second previous comparison. The situation differs from the previous situation because the blinding situations of the split values in the previous comparisons have been different. More specifically, the situation is based on the fact that for the first previous comparison the previous first split value a_A[AC] of the first system has not been blinded and for the second previous comparison the previous second split value b_B[BD] of the second system has been blinded. Therefore, checks that are related to the blinding situations in the previous comparisons may give different results compared to the results of checks leading to the previous situation. The checks relating to the first previous comparison and the second previous comparison may be independent from each other. In such a case still further situations may be created by mixing the results of the checks of the situation and the previous situation.

The situation further includes data items that are accessed, computed, or exchanged between different systems. The representation of data items is according to a previous figure.

The situation includes a data item that is sent from the third system C to the first system A. The data item includes the representation of the previously blinded previous first split value a'_C[AC] of the third system, wherein the representation has been computed using the encryption function E_B to give E_B(a'_C[AC]).

The first system A receives the data item and computes the representation u_1 of the previous first split value a_C[AC] of the third system. This includes reversing the previous blinding and may be done by computing u_1=E_B(((a'_C[AC]−R[AC])/r_[AC]+r_a)r_[AB]+r'_[AB]). R[AC] is a value identical to r'_[AC] in case that the first previous comparison has given a true result, wherein r'_[CA] may be the second blinding variable of the first previous comparison. However, R[AC] is a value identical to r'''_[AC] in case that the first previous comparison has given a false result, wherein r'''_[CA] may be the third blinding variable of the first previous comparison. u_1 is sent as a data item to the second system B.

The second system B identifies the blinded first value a'_B of the second system with the result of the decryption of u_1 using the decryption function D_B. The blinded first value a'_B of the second system B may contribute to the comparison of the split values of the first system A and the second system B.

The first system A may identify the first split value a_A of the first system A with the further representation of the previous first split value a_A[AC] of the first system A by a_A=a_A[AC]−r_a.

The first split value a_A of the first system A may then contribute to computing u_3 according to u_3=r_[AB](b_A−a_A)+r'_[AB]−r''_[AB]−r'''_[AB]. u_3 may be the blinded result of the subtraction of the first split value a_A of the first system from the second split value b_A of the first system and u_3 may be provided to the second system B for the comparison.

Prior to computing u_3 the first system A determines the fourth blinding variable r'''_[AB] and receives the second split value b_A of the first system. The fourth system D has computed the second split value b_A of the first system by identifying it with a still further representation of the previous second split value b_D[BD] of the fourth system D.

The second system B computes the representation of a previously blinded previous second split value b'_B[BD] of the second system B using the encryption function E_B to give E_B(b'_B[BD]). The second system sends the representation to the fourth system D. The fourth system D computes u_2 by reversing the previous blinding and following that by blinding the previous second split value b_B[BD] of the second system B. This may be done by computing u_2=E_B(((b'_B[DB]]−R[DB])/r_[DB]+r_b) r_[AB]+r''_[AB]).

The second system B receives u_2 and identifies the blinded second split value b'_B of the second system B with the result of the decryption function D_B applied to u_2.

The second system B may use the values u_3, a'_B, and b'_B for computing the result of the comparison R_[AB]. R_[AB] is true in case that u_3−a'_B+b'_B<0 is true and R_[AB] is false in case that u_3−a'_B+b'_B<0 is false. According to the result, the second system B exchanges the values a'_B and b'_B in case R_[AB] is false and the first system A exchanges the values a_A and b_A in case R_[AB] is false. The dotted indicates an optional exchange of data in case R_[AB] is false that may lead to the exchange of the values by the first system A.

Figure 9:
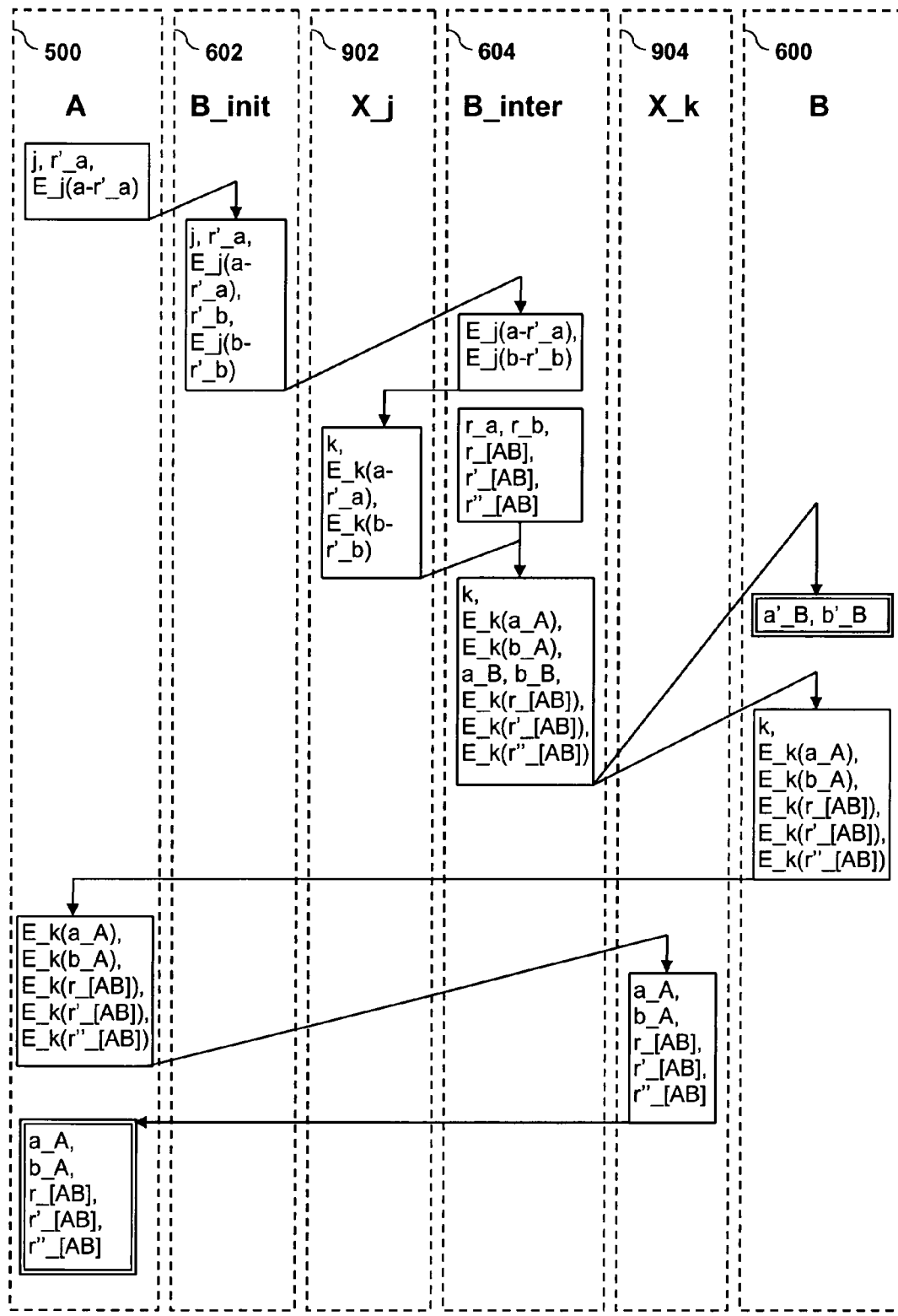
FIG. 9 is an exemplary initial situation with further embodiments and relations between data of the further embodiments.

FIG. 9 is an exemplary initial situation with further embodiments and relations between data of the further embodiments. The further embodiments include operations of the first method, the second method, the third method, and the fourth method. The operations may be method operations that are executed in case the first previous comparison and the second previous comparison have not been computed.

The first method may include, prior to receiving 103 the split values of the first system A 500 selecting a first encryption system X_j 902 that may be different from an initial comparison system B_init 602. The initial comparison system B_init has the second private value b configured to contribute to a split value used for the comparison. It may follow receiving a public key of the homomorphic encryption function from the first encryption system X_j and sending to the initial comparison system B_init: an identifier j of the first encryption system X_j, a hiding value r'_a of the first private value a of the first system A, and an encrypted representation E_j(a−r'_a) of a hidden value a−r'_a. The encrypted representation may be computed with the public key from the first encryption system X_j from the first original value a which the hiding value r'_a is subtracted. The first private value a may be configured to contribute to a further split value used for the comparison. The initial comparison system B_init may send the identifier j, the hiding value r'_a, the encrypted representation E_j(a−r'_a), a further hiding value r'_b for hiding the second private value b, and the encrypted representation E_j(b−r'_b) to an intermediate comparison system B_inter 604. For sending the data from the initial comparison system B_init to the intermediate comparison system B_inter 604 an anonymous channel of a mix network may be used so that the receiving system B_inter may not be able to identify the sending system B_init. Such an anonymous channel of the mix network may be used for exchanging data between the system A, the system B_init, the system B_inter, and the system B. This may provide a further anonymity, that is, a further security against one system being able to draw a conclusion from a data exchange.

It may follow receiving an identifier k of a second encryption system X_k 904, an encrypted representation E_k(a_A) of the first split value a_A of the first system A computed with a public key of the homomorphic encryption function from the second encryption system X_k, and an encrypted representation E_k(b_A) of the second split value b_A of the first system A computed with the public key from the second encryption system X_k. The first system A may further receive the encrypted representation E_k(r_[AB]) of r_[AB], the encrypted representation E_k(r'_[AB]) of r'_[AB], and the encrypted representation E_k(r''_[AB]) of r''_[AB]. The encrypted representations may have been encrypted with the public key of the homomorphic encryption function from the second encryption system X_k. The first method may include sending the received encrypted representations E_k(a_A), E_k(b_A), E_k(r_[AB]), E_k(r'_[AB]), and E_k(r'_[AB]) to the second encryption system X_k. In such a case it may follow receiving 103 the first split value a_A of the first system and the second split value b_A of the first system from the second encryption system X_k, together with r_[AB], r'_[AB], and r''_[AB].

The second method 200 may include prior to computing the result of the subtraction: receiving from an intermediate comparison system B_inter 604 the identifier k of the second encryption system X_k, the blinded first split value a'_B of the second system B 600, the blinded second split value b'_B of the second system B, the encrypted representation E_k (a_A) of the first split value a_A of the first system A computed with the public key of the homomorphic encryption function from the second encryption system X_k 904, and the encrypted representation E_k(b_A) of the second split value b_A of the first system A computed with the public key of the homomorphic encryption function from the second encryption system. Furthermore, the second system B may receive the received encrypted representations E_k(a_A), E_k(b_A), E_k(r_[AB]), E_k(r'_[AB]), and E_k(r"_[AB]). The blinded first split value a'_B of the second system A, the blinded second split value b'_B of the second system B, the encrypted representation of the first split value a_A of the first system A, and the encrypted representation of the second split value b_A of the first system A may have been computed by the intermediate comparison system B_inter 604. The intermediate comparison system B_inter may have used the encrypted representation E_k(a−r'_a) of the hidden value of the first private value a of the first system A computed with the public key of the homomorphic encryption function from the second encryption system X_k. Furthermore, the intermediate comparison system B_inter may have used the encrypted representation E_k(b−r'_b) of the hidden value of the second original value of the initial comparison system B_init computed with the public key of the homomorphic encryption function from the second encryption system X_k. The encrypted representation E_k(a−r'_a) and the encrypted representation E_k(b−r'_b) may have been computed and sent to the intermediate comparison system B_inter by the first encryption system X_j. The first encryption system X_j may have received from the intermediate comparison system B_inter the previously encrypted representation E_j(a−r'_a) of the hidden value of the first original value of the first system A computed with the public key of the homomorphic encryption function from the first encryption system X_j. Furthermore, the first encryption system X_j may have received from the intermediate comparison system B_inter the previously encrypted representation E_j(b−r'_b) of the hidden value of the second original value of the initial comparison system B_init computed with the public key of the homomorphic encryption function from the first encryption system X_j. The previously encrypted representation of the hidden value of the first private value of the first system and the previously encrypted representation of the hidden value of the second private value of the second system may have been sent together with the identifier j of the first encryption system X_j, r'_a, and r'_b to the intermediate comparison system B_inter by an initial comparison system B_init. The second system B may send the identifier of the second encryption system X_k, the encrypted representation E_j(a−r'_a), and the encrypted representation E_j(b−r'_b) to the first system A. The second system B may further send E_k(r_[AB]), E_k(r'_[AB]), and E_k(r"_[AB]) to the second system.

In a previous figure (FIG. 1) four different systems and their relations have been represented. The first system A, the second system B, the third system C, and the fourth system D are embodiments that may have identical processor units and communication units. Furthermore, the system embodiments have features that may correspond to features of the corresponding method embodiments. In following paragraphs the relation between the features of the system embodiments are described in further detail.

In the example, the first system A is configured to execute processes that may include method operations or operations of the first method.

The first system A has the processor unit configured to: compute the representation of the previously blinded previous first split value a'_A[CA] of the first system A and identify the first split value a_A of the first system A with the result of the function of the representation of the previous first split value a_A[CA]) of the first system A, in case that the previous first split value a_A[CA] of the first system A has been blinded for the computed first previous comparison. The first system A has the processor unit configured to: identify the first split value a_A of the first system A with the further representation of the previous first split value a_A[CA] of the first system A, compute the representation of the previous first split value a_C[CA] of the third system C including reversing the previous blinding of the previous first split value a_C[CA] of the third system C and blinding the previous first split value a_C[CA] of the third system C, in case that the previous first split value a_A[CA] of the first system A has not been blinded for the computed first previous comparison. The first system A has the processor unit configured to: identify the split value b_A of the first system A with the result of the function of the representation of the previous second split value b_D[BD] of the fourth system D, in case that the previous second split value b_B[BD] of the second system B has not been blinded for the computed second previous. The first system A has the processor unit configured to blind the result of the subtraction of the first split value a_A of the first system A from the second split value b_A of the first system A independently of the blinding situations in the previous comparisons.

The first system A has the communication unit configured to receive the first split value a_A of the first system A and the second split value b_A of the first system in case that the first previous comparison and the second previous comparison have not been computed. The first system A has the communication unit configured to: send the representation of the previously blinded previous first split value a'_A[CA] of the first system A to the third system C, receive the representation of the previous first split value a_A[CA] of the first system A, in case that the previous first split value a_A[CA] of the first system A has been blinded for the computed first previous comparison. The first system A has the communication unit configured to: receive the representation of the previously blinded previous first split value a'_C[AC] of the third system C, send the representation of the previous first split value a_C[CA] of the third system C to the second system B, in case that the previous first split value a_A[CA] of the first system A has not been blinded for the computed first previous comparison. The first system A has the communication unit configured to: receive the representation of the previous second split value b_D[BD] of the fourth system D, in case that the previous second split value b_B[BD] of the second system B has not been blinded for the computed second previous comparison. The first system A has the communication unit configured to: receive the second split value b_A of the first system A, in case that the previous second split value b_B [BD] of the second system B has been blinded for the computed second previous comparison. The first system A has the communication unit configured to send the blinded result to the second system B independently of the blinding situations in the previous comparisons.

In the example, the second system B is configured to execute processes that may include method operations of the second method.

The second system B may have the processing unit configured to: identify the blinded first split value a'_B of the second system B with the result of the function of the representation of the previous first split value a_C[AC] of the third system C in case that the previous first split value a_A[AC] of the first system A has not been blinded for the computed first previous comparison. The second system B may have the processing unit configured to: compute the representation of the previous second split value b_B[BD] of the second system B, identify the blinded second split value b'_B of the second system B with the result of the function of the further representation of the previous second split value b_B[BD] of the second system, compute the representation of the previous second split value b_D[BD] of the fourth system D by reversing the previous blinding of the previous second split value b_D[BD] of the fourth system D, in case that the previous second split value b_B[BD] of the second system B has not been blinded for the computed second previous comparison. The second system B may have the processing unit configured to: compute the representation of the previously blinded previous second split value b'_B[BD] of the second system B, identify the blinded second split value b'_B of the second system B with the result of the function of the still further representation of the previous second split value b_B[BD] of the second system B, in case that the previous second split value b_B[BD] of the second system B has been blinded for the computed second previous comparison. The second system B may have the processing unit configured to compute if the result of subtracting the blinded first split value a'_B of the second system B from the received blinded result and adding the blinded second split value b'_B of the second system B is less than the value representing the value of zero.

The second system B may have the communication unit configured to: receive the first split value a'_B of the second system B in case that the previous first split value a_A[CA] of the first system A has been blinded for the computed first previous comparison. The second system B may have the communication unit configured to receive the representation of the previous first split value a_C[AC] of the third system C, in case that the previous first split value a_A[AC] of the first system A has not been blinded for the computed first previous comparison. The second system B may have the communication unit configured to send the representation of the previous second split value b_B[BD] of the second system B to the fourth system D, receive the further representation of the previous second split value b_B[BD] of the second system B, receive the representation of the previously blinded previous second split value b'_D[BD] of the fourth system D, send the representation of the previous second split value b_D[BD] of the fourth system D to the fourth system D, in case that the previous second split value b_B[BD] of the second system B has not been blinded for the computed second previous comparison. The second system B may have the communication unit configured to: send the representation of the previously blinded previous second split value b'_B[BD] of the second system B to the fourth system D, receive the still further representation of the previous second split value b_B[BD] of the second system B, in case that the previous second split value b_B[BD] of the second system B has been blinded for the computed second previous comparison. The second system B may have the communication unit configured to receive the blinded result of the subtraction of the first split value a_A of the first system A from the second split value b_A of the first system A.

In the example, the third system C is configured to execute processes that may include method operations of the third method.

The third system C may have the processor unit configured to: compute the blinded first split value a'_B of the second system B including blinding the previous first split value a_C[CA] of the third system C, compute the representation of the previous first split value a_A[CA] of the first system A including reversing the previous blinding of the previous first split value of the first system a_A[CA], in case that the previous first split value a_A[CA] of the first system A has been blinded for the computed first previous comparison. The third system C may have the processor unit configured to: compute the representation of the previously blinded previous first split value a'_C[CA] of the third system C in case that the previous first split value a_A[CA] of the first system A has not been blinded for the computed first previous comparison.

The third system C may have the communication unit configured to: send the blinded first split value a'_B of the second system B to the second system B, receive the representation of the previously blinded previous first split value a'_A[CA] of the first system A, send the representation of the previous first split value a_A[CA] of the first system A to the first system A, in case that the previous first split value a_A[CA] of the first system A has been blinded for the computed first previous comparison. The third system C may have the communication unit configured to: send the representation of the previously blinded previous first split value a'_C[CA] of the third system C, in case that the previous first split value a_A[CA] of the first system A has not been blinded for the computed first previous comparison.

In the example, the fourth system D is configured to execute processes that may include method operations of the fourth method.

The fourth system D may have the processing unit configured to: compute the representation of the previously blinded previous second split value b'_D[BD] of the fourth system D, compute the further representation of the previous second split value b_D[BD] of the fourth system D from the representation of the previous second split value b_D[BD] of the fourth system D, compute the further representation of the previous second split value b_B[BD] of the second system B including blinding the previous first split value b_B[BD] of the second system B, in case that the previous second split value b_B[BD] of the second system B has not been blinded for the computed second previous comparison. The fourth system D may have the processing unit configured to: compute the still further representation of the previous second split value b_B[BD] of the second system B including reversing the previous blinding of the previous second split value b_B[BD] of the second system B and blinding the previous second split value b_B[BD] of the second system B, identify the second split values b_A of the first system A with the still further representation of the previous second split value b_D[BD] of the fourth system D, in case that the previous second split value b_B[BD] of the second system B has been blinded for the computed second previous comparison.

The fourth system D may have the communication unit configured to: send the representation of the previously blinded previous second split value b'_D[BD] of the fourth system D to the second system B, receive the representation of the previous second split value b_D[BD] of the fourth system D, send the further representation of the previous second split value b_D[BD] of the fourth system D to the first system A, receive the representation of the previous second split value b_B[BD] of the second system B, send the further representation of the blinded previous second split value b_B[BD] of the second system B to the second system B, in case that the previous second split value b_B[BD] of the second system B has not been blinded for the computed second previous comparison. The fourth system D may have the communication unit configured to: receive the representation of the previously blinded previous second split value b'_B[BD] of the second system B, send the still further representation of the previous second split value b_B[BD] of the second system B to the second system B, in case that the previous second split value b_B[BD] of the second system B has been blinded for the computed second previous comparison. The fourth system D may have the communication unit configured to send the second split value b_A of the first system A to the first system A.

As noted above, embodiments include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. In case that the computer-executable instructions are transformed, a first computer may for example transform the computer-executable instructions into the executable format and a second computer may execute the transformed instructions.

The invention is described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing operations of the methods disclosed herein. The particular sequence of such executable instructions or associated data structures represents examples of corresponding acts for implementing the functions described in such operations.

The present invention in some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The invention claimed is:

1. A computer-implemented method for providing the blinded result of a subtraction of a first split value (a_A) of a first system from a second split value (b_A) of the first system for a comparison, the first method comprising the first system:
   receiving the first split value of the first system and the second split value of the first system, in case that a first previous comparison between split values of the first system and a third system and a second previous comparison between split values of a second system and a fourth system have not been computed;
   computing a representation of a previously blinded previous first split value (a'_A[CA]) of the first system, in case that the previous first split value (a_A[CA]) of the first system has been blinded for the computed first previous comparison;
   sending the representation of the previously blinded previous first split value (a'_A[CA]) of the first system to the third system, in case that the previous first split value (a_A[CA]) of the first system has been blinded for the computed first previous comparison;
   receiving a representation of the previous first split value (a_A[CA]) of the first system, in case that the previous first split value (a_A[CA]) of the first system has been blinded for the computed first previous comparison;
   identifying the first split value (a_A) of the first system with a result of a function of the representation of the previous first split value (a_A[CA]) of the first system, in case that the previous first split value (a_A[CA]) of the first system has been blinded for the computed first previous comparison;
   identifying the first split value (a_A) of the first system with a further representation of the previous first split value (a_A[CA]) of the first system, in case that the previous first split value (a_A[CA]) of the first system has not been blinded for the computed first previous comparison;
   receiving a representation of a previously blinded previous first split value (a'_C[AC]) of the third system, in case that the previous first split value (a_A[CA]) of the first system has not been blinded for the computed first previous comparison;
   computing a representation of a previous first split value (a_C[CA]) of the third system comprising reversing a previous blinding of the previous first split value (a_C[CA]) of the third system and blinding the previous first split value (a_C[CA]) of the third system, in case that the previous first split value (a_A[CA]) of the first system has not been blinded for the computed first previous comparison;
   sending the representation of the previous first split value (a_C[CA]) of the third system to the second system, in case that the previous first split value (a_A[CA]) of the first system has not been blinded for the computed first previous comparison;
   receiving a representation of a previous second split value (b_D[BD]) of the fourth system, in case that the previous second split value (b_B[BD]) of the second system has not been blinded for the computed second previous comparison;

identifying the second split value (b_A) of the first system with a result of the function of the representation of the previous second split value (b_D[BD]) of the fourth system, in case that the previous second split value (b_B[BD]) of the second system has not been blinded for the computed second previous comparison;

receiving the second split value (b_A) of the first system, in case that the previous second split value (b_B[BD]) of the second system has been blinded for the computed second previous comparison;

blinding the result of the subtraction of the first split value (a_A) of the first system from the second split value (b_A) of the first system; and sending the blinded result to the second system.

2. The method of claim 1 further comprising:

computing the further representation of the previous first split value (a_A[CA]) of the first system comprising subtracting a first variable (r_a) from the previous first split value (a_A[CA]) of the first system, in case that the previous first split value (a_A[CA]) of the first system has not been blinded for the computed first previous comparison; and computing the representation of the previous first split value (a_C[CA]) of the third system comprising adding the first variable (r_a) to the previous first split value (a_C[CA]) of the third system, in case that the previous first split value (a_A[CA]) of the first system has not been blinded for the computed first previous comparison.

3. The method of claim 2 wherein:

blinding the previous first split value (a_C[CA]) of the third system comprises multiplying the previous first split value (a_C[CA]) of the third system and the first variable (r_a) with a first blinding value (r_[AB]) and adding a second blinding value (r'_[AB]), in case that the previous first split value (a_A[CA]) of the first system has not been blinded for the computed first previous comparison;

blinding the result of the subtraction of the first split value (a_A) of the first system from the second split value (b_A) of the first system comprises multiplying the result with the first blinding value (r_[AB]), adding the second blinding value (r'_[AB]) to the result, and subtracting a third blinding value (r''_[AB]) from the result.

4. The method of claim 3 further comprising:

determining a fourth blinding value (r'''_[AB]) being smaller than the first blinding value (r_[AB]); and blinding (160) the result of the subtraction of the first split value (a_A) of the first system from the second split value (b_A) of the first system comprising subtracting the fourth blinding value (r'''_[AB]) from the result.

5. The method of claim 1 wherein:

computing the representation of the previously blinded previous first split value (a'_A[CA]) of the first system comprises encrypting the previously blinded previous first split value (a'_A[CA]) of the first system with a homomorphic encryption function (E_A), in case that the previous first split value (a_A[CA]) of the first system has been blinded for the computed first previous comparison;

computing the result of the function (D_A) of the representation of the previous first split value (a_A[CA]) of the first system with the function being a decryption function (D_A) configured to decrypt a value that has been encrypted with the homomorphic encryption function (E_A), in case that the previous first split value (a_A[CA]) of the first system has been blinded for the computed first previous comparison;

computing the representation of the previous first split value of the third system using the homomorphic encryption function (E_A), in case that the previous first split value (a_A[CA]) of the first system (500) has not been blinded for the computed first previous comparison;

computing the result of the function (D_A) of the representation of the previous second split value (b_D[BD]) of a fourth system with the function being the decryption function (D_A), in case that the previous second split value (b_B[BD]) of a second system has not been blinded for the computed second previous comparison.

6. The method of claim 1 further comprising in case the first previous comparison and the second previous comparison have not been computed:

selecting a first encryption system being different from an initial comparison system, wherein the initial comparison system has a second original value configured to contribute to a split value used for the comparison;

receiving a public key of a homomorphic encryption function from the first encryption system;

sending to the initial comparison system an identifier of the first encryption system, a hiding value, and an encrypted representation of a hidden value computed with the public key from the first encryption system, wherein the hidden value is computed from a first private value of the first system from which the hiding value is subtracted, the first private value being configured to contribute to a further split value used for the comparison;

receiving an identifier of a second encryption system, an encrypted representation of the first split value (a_A) of the first system computed with a public key of the homomorphic encryption function from the second encryption system, and an encrypted representation of the second split value (b_A) of the first system computed with the public key from the second encryption system;

sending the encrypted representation of the first split value (a_A) of the first system and the encrypted representation of the second split value (b_A) of the first system to the second encryption system; and receiving (103) the first split value (a_A) of the first system and the second split value (b_A) of the first system from the second encryption system.

7. A computer-implemented method for computing a comparison of a blinded result of a subtraction of a first split value (a_A) of a first system from a second split value (b_A) of the first system with a result of a subtraction of a blinded first split value (a'_B) of a second system from a blinded second split value (b'_B) of the second system, the second method comprising the second system:

receiving the blinded first split value (a'_B) of the second system and the blinded second split value (b'_B) of the second system, in case that a first previous comparison between split values of the first system and a third system and a second previous comparison between split values of the second system and a fourth system have not been computed;

receiving the first split value (a'_B) of the second system, in case that a previous first split value (a_A[CA]) of the first system has been blinded for the computed first previous comparison;

receiving a representation of the previous first split value (a_C[AC]) of the third system, in case that the previous first split value (a_A[AC]) of the first system has not been blinded for the computed first previous comparison;

identifying the blinded first split value (a'_B) of the second system with a result of a function of the representation of the previous first split value (a_C[AC]) of the third system, in case that the previous first split value (a_A[AC]) of the first system has not been blinded for the computed first previous comparison;

computing a representation of a previous second split value (b_B[BD]) of the second system, in case that the previous second split value (b_B[BD]) of the second system has not been blinded for the computed second previous comparison;

sending the representation of the previous second split value (b_B[BD]) of the second system to the fourth system, in case that the previous second split value (b_B[BD]) of the second system has not been blinded for the computed second previous comparison;

receiving a further representation of the previous second split value (b_B[BD]) of the second system, in case that the previous second split value (b_B[BD]) of the second system has not been blinded for the computed second previous comparison;

identifying the blinded second split value (b'_B) of the second system with a result of a function of the further representation of the previous second split value (b_B[BD]) of the second system, in case that the previous second split value (b_B[BD]) of the second system has not been blinded for the computed second previous comparison;

receiving a representation of a previously blinded previous second split value (b'_D[BD]) of the fourth system, in case that the previous second split value (b_B[BD]) of the second system has not been blinded for the computed second previous comparison;

computing a representation of a previous second split value (b_D[BD]) of the fourth system by reversing a previous blinding of the previous second split value (b_D[BD]) of the fourth system, in case that the previous second split value (b_B[BD]) of the second system has not been blinded for the computed second previous comparison;

sending the representation of the previous second split value (b_D[BD]) of the fourth system to the fourth system, in case that the previous second split value (b_B[BD]) of the second system has not been blinded for the computed second previous comparison;

computing a representation of a previously blinded previous second split value (b'_B[BD]) of the second system, in case that the previous second split value (b_B[BD]) of the second system has been blinded for the computed second previous comparison;

sending the representation of the previously blinded previous second split value (b'_B[BD]) of the second system to the fourth system, in case that the previous second split value (b_B[BD]) of the second system has been blinded for the computed second previous comparison;

receiving a still further representation of the previous second split value (b_B[BD]) of the second system, in case that the previous second split value (b_B[BD]) of the second system has been blinded for the computed second previous comparison;

identifying the blinded second split value (b'_B) of the second system with a result of a function of the still further representation of the previous second split value (b_B[BD]) of the second system, in case that the previous second split value (b_B[BD]) of the second system has been blinded for the computed second previous comparison;

receiving the blinded result of the subtraction of the first split value (a_A) of the first system from the second split value (b_A) of the first system; and computing if a result of subtracting the blinded first split value (a'_B) of the second system from the received blinded result and adding the blinded second split value (b'_B) of the second system is less than a value representing a value of zero.

8. The method of claim 7 wherein:

computing the result of the function (D_B) of the representation of the previous first split value (a_C[AC]) of the third system with the function being a decryption function (D_B) configured to decrypt a value that has been encrypted with a homomorphic encryption function (E_B), in case that the previous first split value (a_A[AC]) of the first system has not been blinded for the computed first previous comparison;

computing the representation of the previous second split value (b_B[BD]) of the second system by encrypting the previous second split value (b_B[BD]) of the second system with the homomorphic encryption function (E_B), in case that the previous second split value (b_B[BD]) of the second system has not been blinded for the computed second previous comparison;

computing the result of the function (D_B) of the further representation of the previous second split value (b_B[BD]) of the second system with the function (D_B) being the decryption function (D_B), in case that the previous second split value (b_B[BD]) of a second system has not been blinded for the computed second previous comparison;

computing the representation of the previous second split value (b_D[BD]) of the fourth system using the homomorphic encryption function (E_B), in case that the previous second split value (b_B[BD]) of the second system has not been blinded for the computed second previous comparison;

computing the representation of the previously blinded previous second split value (b'_B[BD]) of the second system by encrypting the previously blinded previous second split value (b'_B[BD]) of the second system with the homomorphic encryption function (E_B), in case that the previous second split value (b_B[BD]) of the second system has been blinded for the computed second previous comparison;

computing the result of the function (D_B) of the still further representation of the previous second split value (b_B[BD]) of the second system with the function (D_B) being the decryption function (D_B), in case that the previous second split value (b_B[BD]) of a second system has been blinded for the computed second previous comparison.

9. The method of claim 7 further comprising in case the comparison is a first comparison, prior to computing if the result of subtracting is less than the value representing the value of zero the first system:

receiving from an intermediate comparison system an identifier of a second encryption system, the blinded first split value (a'_B) of the second system, the blinded second split value (b'_B) of the second system, an encrypted representation of the first split value (a_A) of the first system computed with a public key of a homomorphic encryption function from the second encryption system, and an encrypted representation of the second split value (b_A) of the first system computed with the public key of the homomorphic encryption function from the second encryption system; wherein the blinded first split value (a'_B) of the second system, the blinded second split value (b'_B) of the second system, the encrypted representation of the first split value (a_A) of the first system, and the encrypted representation of the second split value (b_A) of the first system have been computed by the intermediate comparison system with an encrypted representation of a hidden value of a first private value of the first system computed with the public key of the homomorphic encryption function from the second encryption system and an encrypted representation of a hidden value of a second private value of the first system computed with the public key of the homomorphic encryption function from the second encryption system, wherein the encrypted representation of a hidden value of the first private value of the first system and the encrypted representation of the hidden value of the second private value of the first system have been computed and sent to the intermediate comparison system by a first encryption system that has received from the intermediate comparison system a previously encrypted representation of the hidden value of the first private value of the first system computed with a public key of the homomorphic encryption function from the first encryption system and a previously encrypted representation of the hidden value of the second private value of the second system computed with the public key of the homomorphic encryption function from the first encryption system, wherein the previously encrypted representation of the hidden value of the first private value of the first system and the previously encrypted representation of the hidden value of the second private value of the second system have been sent together with an identifier of the first encryption system to the intermediate comparison system by an initial comparison system; and sending the identifier of the second encryption system (X_k), the encrypted representation of the first split value (a_A) of the first system, and the encrypted representation of the second split value (b_A) of the first system to the first system.

10. A computer-implemented method for providing a contribution to a comparison of split values, the third method comprising a third system:

computing a blinded first split value (a'_B) of a second system comprising blinding a previous first split value (a_C[CA]), of the third system, in case that a previous first split value (a_A[CA]) of a first system has been blinded for a computed first previous comparison between split values of the first system and the third system;

sending the blinded first split value (a'_B) of the second system to the second system, in case that the previous first split value (a_A[CA]) of the first system has been blinded for the computed first previous comparison;

receiving a representation of a previously blinded previous first split value (a'_A[CA]) of the first system, in case that the previous first split value (a_A[CA]) of the first system has been blinded for the computed first previous comparison;

computing a representation of the previous first split value (a_A[CA]) of the first system comprising reversing a previous blinding of the previous first split value (a_A [CA]), of the first system, in case that the previous first split value (a_A[CA]) of the first system has been blinded for the computed first previous comparison;

sending the representation of the previous first split value (a_A[CA]) of the first system to the first system, in case that the previous first split value (a_A[CA]) of the first system has been blinded for the computed first previous comparison;

computing a representation of a previously blinded previous first split value (a'_C[CA]) of the third system, in case that the previous first split value (a_A[CA]) of the first system has not been blinded for the computed first previous comparison; and sending the representation of the previously blinded previous first split value (a'_C[CA]) of the third system to the first system, in case that the previous first split value (a_A[CA]) of the first system has not been blinded for the computed first previous comparison.

11. The method of claim 10 further comprising:

blinding the previous first split value (a_C[CA]) of the third system comprising subtracting a first variable (r_a) from the previous first split value (a_C[CA]) of the third system prior to blinding the previous first split value (a_C[CA]) of the third system, in case that the previous first split value (a_A[CA]) of the first system has been blinded for the computed first previous comparison; and computing the representation of the previous first split value (a_A[CA]) of the first system comprising adding the first variable (r_a) to the previous first split value (a_A[CA]) of the third system, in case that the previous first split value (a_A[CA]) of the first system has been blinded for the computed first previous comparison.

12. The method of claim 11 wherein blinding the previous first split value (a_C[CA]) of the third system comprises multiplying the previous first split value (a_C[CA]) of the third system decreased by the first variable (r_a) with a first blinding value (r_[AB]) and by adding a second blinding value (r'_[AB]), in case that the previous first split value (a_A[CA]) of the first system has been blinded for the computed first previous comparison.

13. The method of claim 10 wherein:

computing the representation of the previous first split value (a_A[CA]) of the first system using a homomorphic encryption function (E_A), in case that the previous first split value (a_A[CA]) of the first system has been blinded for the computed first previous comparison; and computing the representation of the previously blinded previous first split value (a'_C[CA]) of the third system comprises encrypting the previously blinded previous first split value (a'_C[CA]) of the first system with the homomorphic encryption function (E_A), in case that the previous first split value (a_A[CA]) of the first system has not been blinded for the computed first previous comparison.

14. A computer-implemented method for providing a contribution to a comparison of split values, the fourth method comprising a fourth system:

computing a representation of a previously blinded previous second split value (b'_D[BD]) of the fourth system, in case that the previous second split value (b_B[BD]) of a second system has not been blinded for a computed second previous comparison between split values of the second system and the fourth system;

sending the representation of the previously blinded previous second split value (b'_D[BD]) of the fourth system to the second system, in case that the previous second split value (b_B[BD]) of the second system has not been blinded for the computed second previous comparison;

receiving a representation of the previous second split value (b_D[BD]) of the fourth system, in case that the previous second split value (b_B[BD]) of the second system has not been blinded for the computed second previous comparison;

computing a further representation of the previous second split value (b_D[BD]) of the fourth system from the representation of the previous second split value (b_D[BD]) of the fourth system, in case that the previous second split value (b_B[BD]) of the second system has not been blinded for the computed second previous comparison;

sending the further representation of the previous second split value (b_D[BD]) of the fourth system to a first system, in case that the previous second split value (b_B[BD]) of the second system has not been blinded for the computed second previous comparison;

receiving a representation of a previous second split value (b_B[BD]) of the second system, in case that the previous second split value (b_B[BD]) of the second system has not been blinded for the computed second previous comparison;

computing a further representation of the previous second split value (b_B[BD]) of the second system comprising blinding the previous first split value (b_B[BD]) of a third system, in case that the previous second split value (b_B[BD]) of the second system has not been blinded for the computed second previous comparison;

sending the further representation of the blinded previous second split value (b_B[BD]) of the second system to the second system, in case that the previous second split value (b_B[BD]) of the second system has not been blinded for the computed second previous comparison;

receiving a representation of a previously blinded previous second split value (b'_B[BD]) of the second system, in case that the previous second split value (b_B[BD]) of the second system has been blinded for the computed second previous comparison;

computing a still further representation of the previous second split value (b_B[BD]) of the second system comprising reversing a previous blinding of the previous second split value (b_B[BD]) of the second system and blinding the previous second split value (b_B[BD]) of the second system, in case that the previous second split value (b_B[BD]) of a second system has been blinded for the computed second previous comparison;

sending the still further representation of the previous second split value (b_B[BD]) of the second system to the second system, in case that the previous second split value (b_B[BD]) of the second system has been blinded for the computed second previous comparison;

identifying a second split values (b_A) of the first system with a still further representation of the previous second split value (b_D[BD]) of the fourth system, in case that the previous second split value (b_B[BD]) of the second system has been blinded for the computed second previous comparison;

sending the second split values (b_A) of the first system to the first system.

15. The method of claim 14 further comprising:

computing the further representation of the previous second split value (b_D[BD]) of the fourth system comprising subtracting a second variable (r_b) from the previous second split value (b_D[BD]) of the fourth system, in case that the previous second split value (b_B[BD]) of the second system has not been blinded for the computed second previous comparison;

computing the further representation of the blinded previous second split value (b_B[BD]) of the second system comprising adding the second variable (r_b) to the previous second split value (b_B[BD]) of the second system, in case that the previous second split value (b_B[BD]) of the second system has not been blinded for the computed second previous comparison;

computing the still further representation of the previous second split value (b_B[BD]) of the second system comprising adding the first variable (r_b) to the previous second split value (b_B[BD]) of the second system prior to blinding the previous second split value (b_B[BD]) of the second system, in case that the previous second split value (b_B[BD]) of the second system has been blinded for the computed second previous comparison;

computing the still further representation of the previous second split value (b_D[BD]) of the fourth system comprising subtracting the second variable (r_b) from the previous second split value (b_D[BD]) of the fourth system, in case that the previous second split value (b_B[BD]) of a second system has been blinded for the computed second previous comparison.

16. The method of claim 15 wherein:

blinding the previous second split value (b_B[BD]) of the second system comprises multiplying the previous second split value (b_B[BD]) of the second system and the second variable (r_b) with the first blinding value (r_[AB]) and by adding a third blinding value (r"_[AB]), in case that the previous second split value (b_B[BD]) of the second system has not been blinded for the computed second previous comparison;

blinding the previous second split value (b_B[BD]) of the second system comprises multiplying the previous second split value (b_B[BD]) of the second system and the second variable (r_b) with the first blinding value (r_[AB]) and by adding the third blinding value (r"_[AB]), in case that the previous second split value (b_B[BD]) of the second system has been blinded for the computed second previous comparison.

17. The method of claim 14 wherein:

computing the representation of the previously blinded previous second split value (b'_D[BD]) of the fourth system comprises encrypting the previously blinded previous second split value (b'_D[BD]) of the fourth system with a homomorphic encryption function (E_A), in case that the previous second split value (b_B[BD]) of the second system has not been blinded for the computed second previous comparison; and computing the further representation of the previous second split value (b_B[BD]) of the second system using the homomorphic encryption function (E_A), in case that the previous second split value (b_B[BD]) of the second system has not been blinded for the computed second previous comparison.

18. A first system for providing a blinded result of subtracting a first split value (a_A) of the first system from a second split value (b_A) of the first system for a comparison, the first system comprising:

a processor unit configured to:

compute a representation of a previously blinded previous first split value (a'_A[CA]) of the first system, in case that the previous first split value (a_A[CA]) of the first system has been blinded for a computed first previous comparison between split values of the first system and a third system, identify the first split value (a_A) of a first system with a result of a function of the representation of the previous first split value (a_A[CA]) of the first system, in case that the previous first split value (a_A[CA]) of the first system has been blinded for the computed first previous comparison, identify the first split value (a_A) of the first system with a further representation of the previous first split value (a_A[CA]) of the first system, in case that the previous first split value (a_A[CA]) of the first system has not been blinded for the computed first previous comparison, compute a representation of a previous first split value (a_C[CA]) of the third system comprising reversing a previous blinding of the previous first split value (a_C[CA]) of the third system and by blinding the previous first split value (a_C[CA]) of the third system, in case that the previous first split value (a_A[CA]) of the first system has not been blinded for the computed first previous comparison, identify the split value (b_A) of the first system with a result of the function of the representation of the previous second split value (b_D[BD]) of a fourth system, in case that the previous second split value (b_B[BD]) of a second system has not been blinded for a computed second previous comparison between split values of the second system and the fourth system, blind the result of the subtraction of the first split value (a_A) of the first system from the second split value (b_A) of the first system; and a communication unit configured to:

receive the first split value of the first system and the second split value of the first system, in case that the first previous comparison and the second previous comparison have not been computed;

send the representation of the previously blinded previous first split value (a'_A[CA]) of the first system to the third system, in case that the previous first split value (a_A[CA]) of the first system has been blinded for the computed first previous comparison, receive a representation of the previous first split value (a_A[CA]) of the first system, in case that the previous first split value (a_A[CA]) of the first system has been blinded for the computed first previous comparison, receive a representation of a previously blinded previous first split value (a'_C[AC]) of the third system, in case that the previous first split value (a_A[CA]) of the first system has not been blinded for the computed first previous comparison, send the representation of the previous first split value (a_C[CA]) of the third system to the second system, in case that the previous first split value (a_A[CA]) of the first system has not been blinded for the computed first previous comparison, receive a representation of a previous second split value (b_D[BD]) of the fourth system, in case that the previous second split value (b_B[BD]) of the second system has not been blinded for the computed second previous comparison, receive the second split value (b_A) of the first system, in case that the previous second split value (b_B[BD]) of the second system has been blinded for the computed second previous comparison, send the blinded result to the second system.

19. A second system for computing a comparison of a blinded result of a subtraction of a first split value (a_A) of a first system from a second split value (b_A) of the first system with a result of subtracting a blinded first split value (a'_B) of a second system from a blinded second split value (b'_B) of the second system, the second system comprising: a processor unit configured to: identify the blinded first split value (a'_B) of the second system with a result of a function of the representation of the previous first split value (a_C[AC]) of a third system, in case that the previous first split value (a_A[AC]) of the first system has not been blinded for a computed first previous comparison between split values of the first system and the third system, compute a representation of a previous second split value (b_B[BD]) of the second system, in case that the previous second split value (b_B[BD]) of a second system has not been blinded for a computed second previous comparison between split values of the second system and a fourth system, identify the blinded second split value (b'_B) of the second system with a result of a function of a further representation of the previous second split value (b_B[BD]) of the second system, in case that the previous second split value (b_B[BD]) of the second system has not been blinded for the computed second previous comparison, compute a representation of a previous second split value (b_D[BD]) of the fourth system by reversing a previous blinding of the previous second split value (b_D[BD]) of the fourth system, in case that the previous second split value (b_B[BD]) of the second system has not been blinded for the computed second previous comparison, compute a representation of a previously blinded previous second split value (b'_B[BD]) of the second system, in case that the previous second split value (b_B[BD]) of the second system has been blinded for the computed second previous comparison, identify the blinded second split value (b'_B) of the second system with a result of a function of the still further representation of the previous second split value (b_B[BD]) of the second system, in case that the previous second split value (b_B[BD]) of a second system has been blinded for the computed second previous comparison, compute if a result of subtracting the blinded first split value (a'_B) of the second system from the received blinded result and adding the blinded second split value (b'_B) of the second system is less than a value representing a value of zero; and a communication unit configured to: receive the blinded first split value (a'_B) of the second system and the blinded second split value (b'_B) of the second system, in case that the first previous comparison and the second previous comparison have not been computed, receive the first split value (a'_B) of the second system, in case that a previous first split value (a_A[CA]) of the first system has been blinded for the computed first previous comparison, receive a representation of the previous first split value (a_C[AC]) of the third system, in case that the previous first split value (a_A[AC]) of the first system has not been blinded for the computed first previous comparison, send the representation of the previous second split value (b_B[BD]) of the second system to the fourth system, in case that the previous second split value (b_B[BD]) of a second system has not been blinded for the computed second previous comparison, receive a further representation of the previous second split value (b_B[BD]) of the second system, in case that the previous second split value (b_B[BD]) of the second system has not been blinded for the computed second previous comparison, receive a representation of a previously blinded previous second split value (b'_D[BD]) of the fourth system, in case that the previous second split value (b_B[BD]) of the second system has not been blinded for the computed second previous comparison, send the representation of a previous second split value (b_D[BD]) of the fourth system to the fourth system, in case that the previous second split value (b_B[BD]) of the second system has not been blinded for the computed second previous comparison, send the representation of the previously blinded previous second split value (b'_B[BD]) of the second system to the fourth system, in case that the previous second split value (b_B[BD]) of the second system has been blinded for the computed second previous comparison, receive a still further representation of the previous second split value (b_B[BD]) of the second system, in case that the previous second split value (b_B[BD]) of the second system has been blinded for the computed second previous comparison, receive the blinded result of the subtraction of the first split value (a_A) of the first system (500) from the second split value (b_A) of the first system.

20. A third system for providing a contribution to a comparison of split values, the third system comprising:
a processor unit configured to:
compute a blinded first split value (a'_B) of a second system comprising blinding a previous first split value (a_C[CA]) of the third system, in case that a previous first split value (a_A[CA]) of a first system has been blinded for a computed first previous comparison between split values of the first system and the third system,
compute a representation of the previous first split value (a_A[CA]) of the first system comprising reversing a previous blinding of the previous first split value (a_A[CA]) of the first system, in case that the previous first split value (a_A[CA]) of the first system has been blinded for the computed first previous comparison,
compute a representation of a previously blinded previous first split value (a'_C[CA]) of the third system, in case that the previous first split value (a_A[CA]) of the first system has not been blinded for the computed first previous comparison; and
a communication unit configured to:
send the blinded first split value (a'_B) of the second system to the second system, in case that the previous first split value (a_A[CA]) of the first system has been blinded for the computed first previous comparison,
receive a representation of a previously blinded previous first split value (a'_A[CA]) of the first system, in case that the previous first split value (a_A[CA]) of the first system has been blinded for the computed first previous comparison,
send the representation of the previous first split value (a_A[CA]) of the first system to the first system, in case that the previous first split value (a_A[CA]) of the first system has been blinded for the computed first previous comparison,
send the representation of the previously blinded previous first split value (a'_C[CA]) of the third system, in case that the previous first split value (a_A[CA]) of the first system has not been blinded for the computed first previous comparison.

21. A fourth system for providing a contribution to a comparison of split values, the fourth system comprising: a processor unit configured to: compute a representation of a previously blinded previous second split value (b'_D[BD]) of the fourth system, in case that a previous second split value (b_B[BD]) of a second system has not been blinded for a computed second previous comparison between split values of the second system and the fourth system, compute a further representation of a previous second split value (b_D[BD]) of the fourth system from the representation of the previous second split value (b_D[BD]) of the fourth system, in case that the previous second split value (b_B[BD]) of the second system has not been blinded for the computed second previous comparison, compute a further representation of the previous second split value (b_B[BD]) of the second system comprising blinding the previous first split value (b_B[BD]) of the second system, in case that the previous second split value (b_B[BD]) of the second system has not been blinded for the computed second previous comparison, compute a still further representation of the previous second split value (b_B[BD]) of the second system comprising reversing a previous blinding of the previous second split value (b_B[BD]) of the second system and blinding the previous second split value (b_B[BD]) of the second system, in case that the previous second split value (b_B[BD]) of the second system has been blinded for the computed second previous comparison, identify a second split values (b_A) of the first system with a still further representation of the previous second split value (b_D[BD]) of the fourth system, in case that the previous second split value (b_B[BD]) of the second system has been blinded for the computed second previous comparison; and a communication unit configured to: send the representation of the previously blinded previous second split value (b'_D[BD]) of the fourth system to the second system, in case that the previous second split value (b_B[BD]) of the second system has not been blinded for the computed second previous comparison, receive a representation of the previous second split value (b_D[BD]) of the fourth system, in case that the previous second split value (b_B[BD]) of the second system has not been blinded for the computed second previous comparison, send the further representation of the previous second split value (b_D[BD]) of the fourth system to the first system, in case that the previous second split value (b_B[BD]) of the second system has not been blinded for the computed second previous comparison, receive a representation of the previous second split value (b_B[BD]) of the second system, in case that the previous second split value (b_B[BD]) of the second system has not been blinded for the computed second previous comparison, send the further representation of the blinded previous second split value (b_B[BD]) of the second system to the second system, in case that the previous second split value (b_B[BD]) of the second system has not been blinded for the computed second previous comparison, receive a representation of a previously blinded previous second split value (b'_B[BD]) of the second system, in case that the previous second split value (b_B[BD]) of a second system has been blinded for the computed second previous comparison, send the still further representation of the previous second split value (b_B[BD]) of the second system to the second system, in case that the previous second split value (b_B[BD]) of the second system has been blinded for the computed second previous comparison, send the second split values (b_A) of the first system to the first system.

22. A non-transitory computer readable medium that is configured to be processed by a computer system and causes the computer system to execute method operations according to a method of claim 1.

23. A non-transitory computer readable medium that is configured to be processed by a computer system and causes the computer system to execute method operations according to a method of claim 7.

24. A non-transitory computer readable medium that is configured to be processed by a computer system and causes the computer system to execute method operations according to a method of claim 10.

25. A non-transitory computer readable medium that is configured to be processed by a computer system and causes the computer system to execute method operations according to a method of claim 14.

* * * * *